US011336419B2

(12) United States Patent
Wang et al.

(10) Patent No.: US 11,336,419 B2
(45) Date of Patent: *May 17, 2022

(54) REFERENCE SIGNAL MEASUREMENT METHOD, REFERENCE SIGNAL SENDING METHOD, AND RELATED DEVICE

(71) Applicant: Huawei Technologies Co., Ltd., Shenzhen (CN)

(72) Inventors: Jianguo Wang, Beijing (CN); Jianghua Liu, Beijing (CN); Qiang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

This patent is subject to a terminal disclaimer.

(21) Appl. No.: 16/887,800

(22) Filed: May 29, 2020

(65) Prior Publication Data

US 2020/0295908 A1    Sep. 17, 2020

Related U.S. Application Data

(63) Continuation of application No. 16/034,883, filed on Jul. 13, 2018, now Pat. No. 10,673,599, which is a
(Continued)

(30) Foreign Application Priority Data

Dec. 31, 2012    (CN) .......................... 201210593991.X

(51) Int. Cl.
*H04L 5/00* (2006.01)
*H04W 24/06* (2009.01)
(Continued)

(52) U.S. Cl.
CPC ......... *H04L 5/0092* (2013.01); *H04B 7/0626* (2013.01); *H04L 5/0023* (2013.01);
(Continued)

(58) Field of Classification Search
CPC ... H04L 5/0092; H04L 5/0051; H04L 5/0048; H04L 5/0094; H04L 5/0023; H04W 24/06; H04B 7/0626; H04B 17/318
See application file for complete search history.

(56) References Cited

U.S. PATENT DOCUMENTS

| 10,027,463 B2 | 7/2018 | Wang et al. |
| 2011/0170435 A1 | 7/2011 | Kim et al. |

(Continued)

FOREIGN PATENT DOCUMENTS

| CN | 101534285 A | 9/2009 |
| CN | 101541085 A | 9/2009 |

(Continued)

OTHER PUBLICATIONS

Huawei, "CSI-RS Pattern Signalling," 3GPP TSG RAN WG1 meeting #62, R1-104290, Madrid, Spain, Aug. 23-27, 2010, 6 pages.

(Continued)

*Primary Examiner* — Ayaz R Sheikh
*Assistant Examiner* — Tarell A Hampton
(74) *Attorney, Agent, or Firm* — Slater Matsil, LLP

(57) ABSTRACT

A reference signal measurement method, a reference signal sending method, a user equipment, and a base station are provided. According to the embodiments of the present application, a user equipment determines reference signal resource configuration, which includes reference signal port configuration, reference signal subframe configuration, and reference signal configuration, and a quantity of ports configured in the reference signal port configuration is N; receives a reference signal according to the reference signal resource configuration; and performs measurement based on the received reference signal to obtain channel state information and/or signal quality information. In the embodi-
(Continued)

ments of the present invention, a quantity of ports configured in the reference signal port configuration is N; and a quantity of supported ports may vary with different values of N.

20 Claims, 10 Drawing Sheets

Related U.S. Application Data continuation of application No. 14/754,273, filed on Jun. 29, 2015, now Pat. No. 10,027,463, which is a continuation of application No. PCT/CN2013/090230, filed on Dec. 23, 2013.

(51) Int. Cl.
*H04B 7/06* (2006.01)
*H04B 17/318* (2015.01)

(52) U.S. Cl.
CPC .......... *H04L 5/0048* (2013.01); *H04L 5/0051* (2013.01); *H04L 5/0094* (2013.01); *H04W 24/06* (2013.01); *H04B 17/318* (2015.01)

(56) References Cited

U.S. PATENT DOCUMENTS

| | | |
|---|---|---|
| 2011/0317657 A1 | 12/2011 | Chmiel et al. |
| 2012/0120891 A1 | 5/2012 | Mazzarese et al. |
| 2012/0134273 A1 | 5/2012 | Bhattad et al. |
| 2012/0201163 A1 | 8/2012 | Jongren et al. |
| 2012/0287875 A1 | 11/2012 | Kim et al. |
| 2013/0094419 A1 | 4/2013 | Sumasu et al. |
| 2013/0163544 A1 | 6/2013 | Lee et al. |
| 2014/0161205 A1 | 6/2014 | Jalloul et al. |
| 2014/0192762 A1* | 7/2014 | Li .................. H04B 7/0486 370/329 |
| 2014/0226509 A1 | 8/2014 | Ko et al. |
| 2015/0092875 A1 | 4/2015 | Kim et al. |
| 2015/0257132 A1 | 9/2015 | Park et al. |
| 2015/0271814 A1 | 9/2015 | Park et al. |
| 2015/0318973 A1 | 11/2015 | Wang et al. |
| 2016/0006547 A1 | 1/2016 | Kang et al. |
| 2016/0050153 A1 | 2/2016 | Xu et al. |

FOREIGN PATENT DOCUMENTS

| | | |
|---|---|---|
| CN | 101677306 A | 3/2010 |
| CN | 101777945 A | 7/2010 |
| CN | 102255689 A | 11/2011 |
| CN | 102340801 A | 2/2012 |
| CN | 102438312 A | 5/2012 |
| CN | 102484874 A | 5/2012 |
| CN | 102549997 A | 7/2012 |
| CN | 102647790 A | 8/2012 |
| CN | 102711251 A | 10/2012 |
| CN | 102754357 A | 10/2012 |
| CN | 103347298 A | 10/2013 |
| WO | 2011103309 A2 | 8/2011 |
| WO | 20110158436 A1 | 12/2011 |
| WO | 2012099322 A1 | 7/2012 |
| WO | 2012150842 A2 | 11/2012 |
| WO | 2012152206 A1 | 11/2012 |
| WO | 2012177047 A2 | 12/2012 |
| WO | 2014051374 A1 | 4/2014 |

OTHER PUBLICATIONS

LG Electronics, "Discussion on EREG definition", 3GPP TSG RAN WG1 Meeting #70 R1-123524, Qingdao, China, Aug. 13-17, 2012, 8 pages.

* cited by examiner

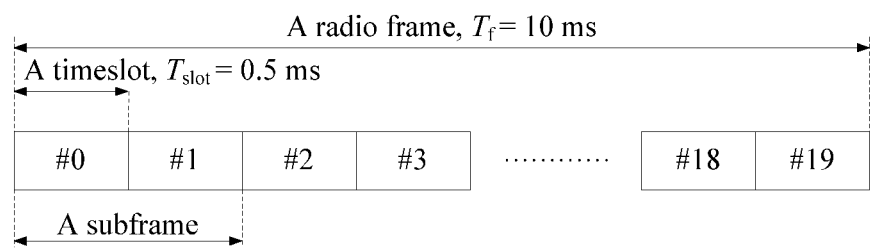
FIG. 1-a

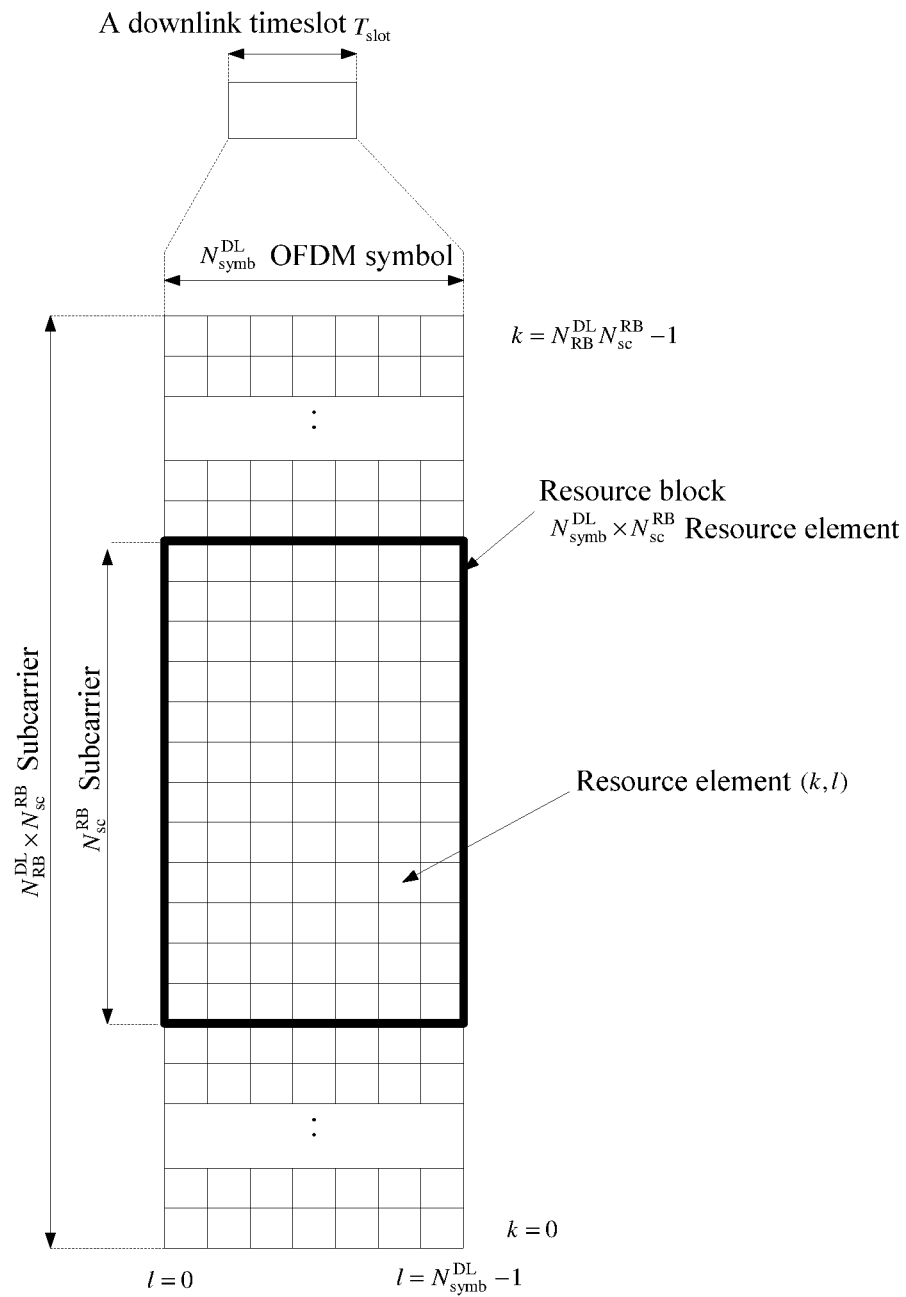
FIG. 1–b

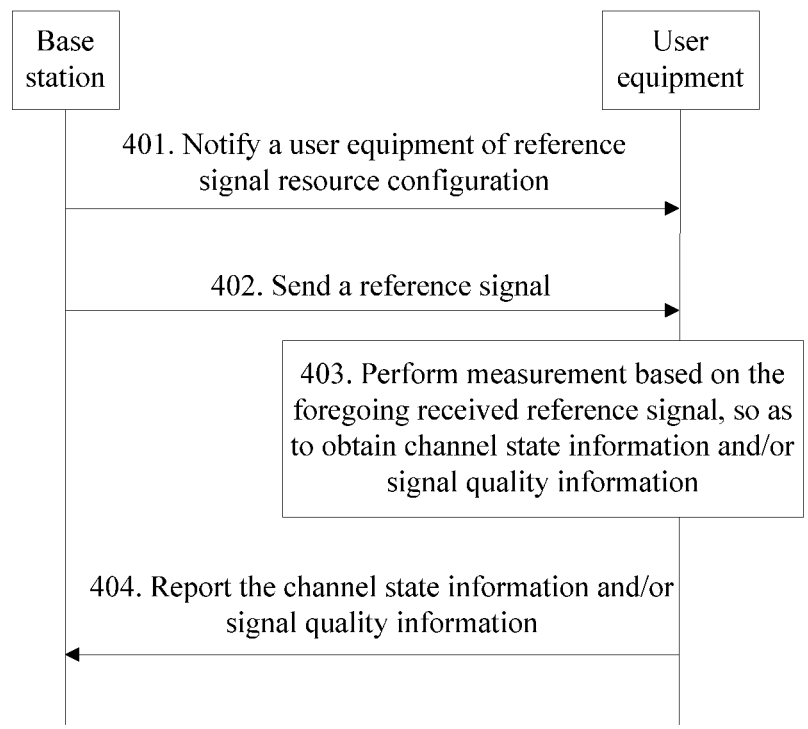
FIG. 4-a
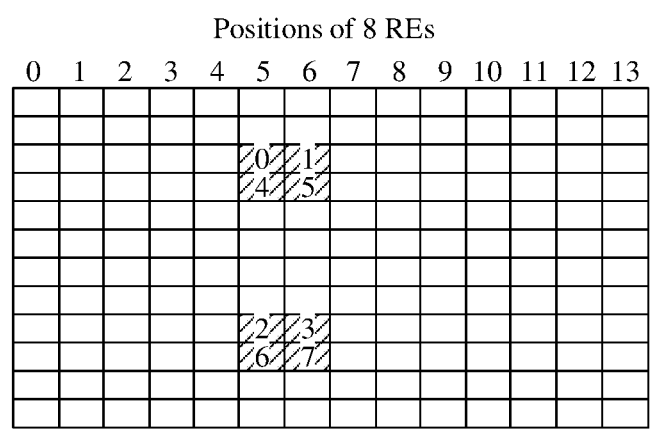
FIG. 4-b

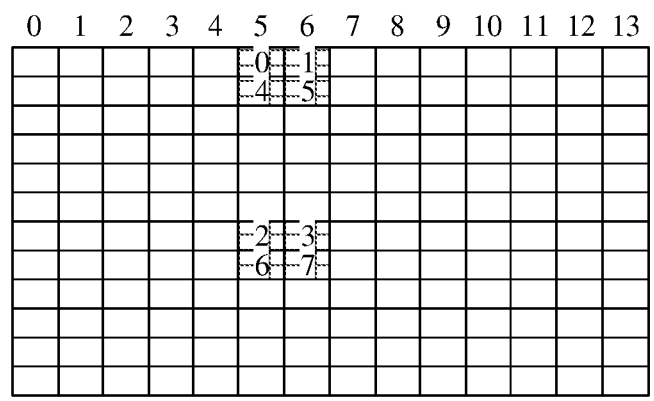
FIG. 4-c
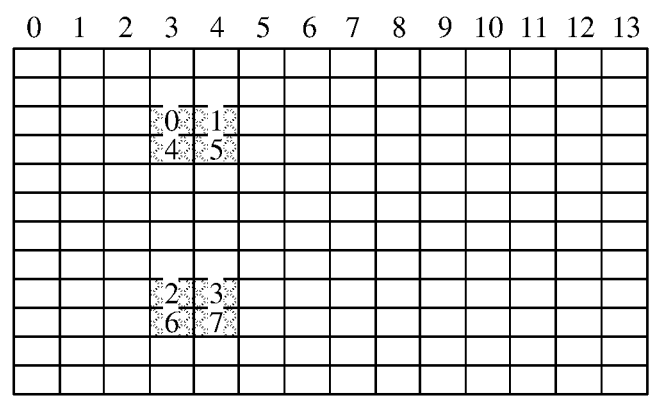
FIG. 4-d

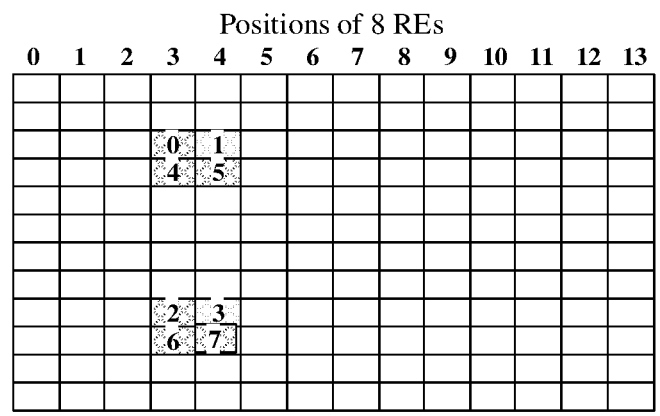
FIG. 4-e
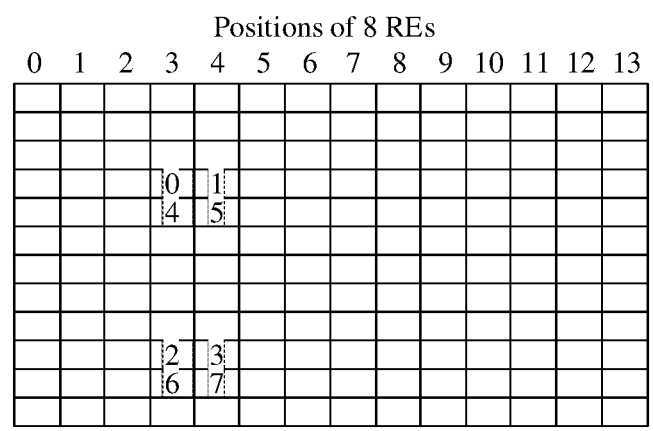
FIG. 4-f

REFERENCE SIGNAL MEASUREMENT METHOD, REFERENCE SIGNAL SENDING METHOD, AND RELATED DEVICE

CROSS-REFERENCE TO RELATED APPLICATIONS

This application is a continuation of U.S. patent application Ser. No. 16/034,883, filed on Jul. 13, 2018, which is a continuation of U.S. patent application Ser. No. 14/754,273, filed on Jun. 29, 2015, now U.S. Pat. No. 10,027,463, which is a continuation of International Application No. PCT/CN2013/090230, filed on Dec. 23, 2013. The International Application claims priority to Chinese Patent Application No. 201210593991.X, filed on Dec. 31, 2012. All of the afore-mentioned patent applications are hereby incorporated by reference in their entireties.

TECHNICAL FIELD

The present application relates to the field of communications technologies, and specifically to a reference signal measurement method, a reference signal sending method, and a related device.

BACKGROUND

Currently, a communications system generally uses different types of reference signals: one type of reference signal is used to estimate a channel, so as to perform coherent demodulation on a received signal that includes control or data information; another type of reference signal is used for a channel state/channel quality measurement, so as to implement scheduling, or implement selection of a cell, a transmitting point, or a receiving point, or the like.

For example, in a downlink system of long term evolution (LTE) R10 developed by the 3rd generation partnership project (3GPP), a reference signal used for coherent demodulation is called a demodulation reference signal (DMRS), where the DMRS is also called a user equipment (UE)specific reference signal; and a reference signal used for channel state information measurement is called a channel state information reference signal (CSI-RS). The DMRS is sent together with data of a physical downlink shared channel (PDSCH) and used for channel estimation during PDSCH demodulation. The CSI-RS can be used by a UE in an R10 system to measure a channel state, especially for a multi-antenna transmission situation. A rank indicator (RI)/a precoding matrix indicator (PMI)/a channel quality indicator (CQI), and other feedback information can be exported based on the CSI-RS channel measurement. In addition, a cell-specific reference signal (CRS) can be used by a UE to estimate a channel, so as to perform demodulation on a physical downlink control channel (PDCCH) and another common channel, where the reference signal is inherited from an LTE R8/9 system. The CRS is also used for channel state information measurement and data channel demodulation in the LTE R8/9 system. In LTE R8-R11 systems, the CRS is also used for signal quality information measurement, so as to implement selection of a cell, a transmitting point, or a receiving point.

In addition, in an LTE R11 system, the DMRS in LTE R10 supports a maximum of eight antenna ports, where a quantity of DMRS antenna ports that is used by each UE depends on scheduling, and scheduling information may be notified to each UE by using downlink control information (DCI). The CSI-RS in LTE R10 supports a maximum of eight antenna ports, where a quantity of antenna ports may be one, two, four, or eight. The CRS in LTE R8-R10 supports a maximum of four antenna ports, where a quantity of antenna ports may be one, two, or four.

During the research and practice of the prior art, the inventor of the present application finds that the existing LTE R10 supports a maximum of only eight antenna ports; as communications traffic increases, eight antenna ports cannot meet a requirement in some scenarios.

SUMMARY

Embodiments of the present application provide a reference signal measurement method, a reference signal sending method, a user equipment, and a base station, so as to flexibly support multiple antenna ports.

A first aspect of the present application provides a reference signal measurement method, including determining reference signal resource configuration, where the reference signal resource configuration includes reference signal port configuration, reference signal subframe configuration, and reference signal configuration. The method further includes receiving a reference signal based on the reference signal resource configuration; and performing measurement based on the received reference signal, so as to obtain channel state information and/or signal quality information.

With reference to the first aspect, in a first possible implementation manner, a subframe configured in the reference signal subframe configuration does not include one or more of the following subframes: a subframe used for transmission over a physical downlink control channel, where the physical downlink control channel carries downlink control information used for scheduling a physical downlink shared channel; a subframe used for transmission over a physical downlink shared channel; a subframe used for transmitting a demodulation reference signal (DMRS); and a subframe used for transmitting a part or entirety of cell-specific reference signals (CRS).

With reference to the first aspect or the first possible implementation manner of the first aspect, in a second possible implementation manner, a subframe configured in the reference signal subframe configuration is a multicast-broadcast single frequency network (MBSFN) subframe.

With reference to the first aspect, the first possible implementation manner of the first aspect, or the second possible implementation manner of the first aspect, in a third possible implementation manner, N resource elements in each physical resource block pair that are configured in the reference signal configuration and carry a reference signal are: N resource elements in M resource element groups, where each resource element group in the M resource element groups includes eight resource elements, and M is an integer greater than or equal to 2; and N is a quantity of ports configured in the reference signal port configuration, and N is greater than 8, equal to 8, or less than 8.

With reference to the third possible implementation manner of the first aspect, in a fourth possible implementation manner. The N resource elements in each physical resource block pair that are configured in the reference signal configuration and carry a reference signal are: N resource elements in X resource element groups in the M resource element groups, where X is a smallest integer not less than N/8, and X is a positive integer less than or equal to M.

With reference to the third possible implementation manner of the first aspect or the fourth possible implementation manner of the first aspect, in a fifth possible implementation manner, the M resource element groups include at least one of the following eight resource element groups: a first resource element group, a second resource element group, a third resource element group, a fourth resource element group, a fifth resource element group, a sixth resource element group, a seventh resource element group, and an eighth resource element group. Alternatively, the M resource element groups include at least one of the following six resource element groups: a ninth resource element group, a tenth resource element group, an eleventh resource element group, a twelfth resource element group, a thirteenth resource element group, and a fourteenth resource element group.

A position of a resource element is denoted by a triplet (k', l', $n_s$ mod 2), where in the triplet (k',l', $n_s$, mod 2), k' indicates an index of a subcarrier corresponding to the resource element in a physical resource block pair in which the resource element is located; l' indicates an index of an orthogonal frequency division multiplexing OFDM symbol corresponding to the resource element in the physical resource block pair in which the resource element is located; $n_s$ indicates an index of a timeslot in which the resource element is located; and $n_s$ mod 2 indicates a value obtained by performing a modulo-2 operation on $n_s$.

Positions of the eight resource elements in the first resource element group are respectively denoted by the triplet (k',l',$n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

Positions of the eight resource elements in the second resource element group are respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the third resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the fourth resource element group are respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the fifth resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the sixth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the seventh resource element group are respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the eighth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the ninth resource element group are respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the tenth resource element group are respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group are respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group are respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirteenth resource element group are respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group are respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

A second aspect of the present application provides a reference signal sending method, including notifying a user equipment of reference signal resource configuration, where the reference signal resource configuration includes reference signal port configuration, reference signal subframe configuration, and reference signal configuration; and sending a reference signal to the user equipment according to the notified reference signal resource configuration.

With reference to the second aspect, in a first possible implementation manner, a subframe configured in the reference signal subframe configuration does not include one or more of the following subframes: a subframe used for transmission over a physical downlink control channel, where the physical downlink control channel carries downlink control information used for scheduling a physical downlink shared channel; a subframe used for transmission over a physical downlink shared channel; a subframe used for transmitting a demodulation reference signal (DMRS); and a subframe used for transmitting a part or entirety of cell-specific reference signals (CRS).

With reference to the second aspect or the first possible implementation manner of the second aspect, in a second possible implementation manner, a subframe configured in the reference signal subframe configuration is a multicast-broadcast single frequency network (MBSFN) subframe.

With reference to the second aspect, the first possible implementation manner of the second aspect, or the second possible implementation manner of the second aspect, in a third possible implementation manner, N resource elements in each physical resource block pair that are configured in the reference signal configuration and carry a reference signal are: N resource elements in M resource element groups, where each resource element group in the M resource element groups includes eight resource elements, and M is an integer greater than or equal to 2; and N is a quantity of ports configured in the reference signal port configuration, and N is greater than 8, equal to 8, or less than 8.

With reference to the third possible implementation manner of the second aspect, in a fourth possible implementation manner. The N resource elements in each physical resource block pair that are configured in the reference signal configuration and carry a reference signal are N resource elements in X resource element groups in the M resource element groups, where X is a smallest integer not less than N/8, and X is a positive integer less than or equal to M.

With reference to the third possible implementation manner of the second aspect or the fourth possible implementation manner of the second aspect, in a fifth possible implementation manner, the M resource element groups include at least one of the following eight resource element groups: a first resource element group, a second resource element group, a third resource element group, a fourth resource element group, a fifth resource element group, a sixth resource element group, a seventh resource element group, and an eighth resource element group. Alternatively, the M resource element groups include at least one of the following six resource element groups: a ninth resource element group, a tenth resource element group, an eleventh resource element group, a twelfth resource element group, a thirteenth resource element group, and a fourteenth resource element group.

A position of a resource element is denoted by a triplet (k',l',$n_s$ mod 2), where in the triplet (k',l',$n_s$ mod 2), k' indicates an index of a subcarrier corresponding to the resource element in a physical resource block pair in which the resource element is located; l' indicates an index of an orthogonal frequency division multiplexing OFDM symbol corresponding to the resource element in the physical resource block pair in which the resource element is located; $n_s$ indicates an index of a timeslot in which the resource element is located; and $n_s$ mod 2 indicates a value obtained by performing a modulo-2 operation on $n_s$.

Positions of the eight resource elements in the first resource element group are respectively denoted by the triplet (k',l',$n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

Positions of the eight resource elements in the second resource element group are respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the third resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the fourth resource element group are respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the fifth resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the sixth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the seventh resource element group are respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the eighth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the ninth resource element group are respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the tenth resource element group are respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group are respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group are respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirteenth resource element group are respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group are respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

A third aspect of the present application provides a user equipment, including a configuration determining unit configured to determine reference signal resource configuration. The reference signal resource configuration includes reference signal port configuration, reference signal subframe configuration, and reference signal configuration. A receiving unit is configured to receive a reference signal based on the reference signal resource configuration. A measuring unit is configured to perform measurement based on the received reference signal, so as to obtain channel state information and/or signal quality information.

With reference to the third aspect, in a first possible implementation manner, a subframe configured in the reference signal subframe configuration determined by the configuration determining unit does not include one or more of the following subframes: a subframe used for transmission over a physical downlink control channel, where the physical downlink control channel carries downlink control information used for scheduling a physical downlink shared channel; a subframe used for transmission over a physical downlink shared channel; a subframe used for transmitting a demodulation reference signal (DMRS); and a subframe used for transmitting a part or entirety of cell-specific reference signals (CRS).

With reference to the third aspect or the first possible implementation manner of the third aspect, in a second possible implementation manner, a subframe configured in the reference signal subframe configuration determined by the configuration determining unit is a multicast-broadcast single frequency network (MBSFN) subframe.

With reference to the third aspect, the first possible implementation manner of the third aspect, or the second possible implementation manner of the third aspect, in a third possible implementation manner, N resource elements in each physical resource block pair that are configured in the reference signal configuration and carry a reference signal are: N resource elements in M resource element groups, where each resource element group in the M resource element groups includes eight resource elements, and M is an integer greater than or equal to 2; and N is a quantity of ports configured in the reference signal port configuration, and N is greater than 8, equal to 8, or less than 8.

With reference to the third possible implementation manner of the third aspect, in a fourth possible implementation manner, the N resource elements in each physical resource block pair that are configured in the reference signal configuration and carry a reference signal are: N resource elements in X resource element groups in the M resource element groups, where X is a smallest integer not less than N/8, and X is a positive integer less than or equal to M.

With reference to the third possible implementation manner of the third aspect or the fourth possible implementation manner of the third aspect, in a fifth possible implementation manner, the M resource element groups include at least one of the following eight resource element groups: a first resource element group, a second resource element group, a third resource element group, a fourth resource element group, a fifth resource element group, a sixth resource element group, a seventh resource element group, and an eighth resource element group. Alternatively, the M resource element groups include at least one of the following six resource element groups: a ninth resource element group, a tenth resource element group, an eleventh resource element group, a twelfth resource element group, a thirteenth resource element group, and a fourteenth resource element group.

A position of a resource element is denoted by a triplet (k',l',$n_s$ mod 2), where in the triplet (k',l',$n_s$ mod 2), k' indicates an index of a subcarrier corresponding to the resource element in a physical resource block pair in which the resource element is located; l' indicates an index of an orthogonal frequency division multiplexing OFDM symbol corresponding to the resource element in the physical resource block pair in which the resource element is located; $n_s$ indicates an index of a timeslot in which the resource element is located; and $n_s$ mod 2 indicates a value obtained by performing a modulo-2 operation on $n_s$.

Positions of the eight resource elements in the first resource element group are respectively denoted by the triplet (k',l',$n_s$ mod 2) as follows:
{(9,5,0), (9,6,0), (3,5,0), (3,6,0), (8,5,0), (8,6,0), (2,5,0), (2,6,0)}; or
{(11,2,1), (11,3,1), (5,2,1), (5,3,1), (10,2,1), (10,3,1), (4,2,1), (4,3,1)}; or
{(9,2,1), (9,3,1), (3,2,1), (3,3,1), (8,2,1), (8,3,1), (2,2,1), (2,3,1)}; or
{(7,2,1), (7,3,1), (1,2,1), (1,3,1), (6,2,1), (6,3,1), (0,2,1), (0,3,1)}; or
{(9,5,1), (9,6,1), (3,5,1), (3,6,1), (8,5,1), (8,6,1), (2,5,1), (2,6,1)}.

Positions of the eight resource elements in the second resource element group are respectively denoted by the triplet (k',l',$n_s$ mod 2) as follows:
{(11,5,0), (11,6,0), (5,5,0), (5,6,0), (10,5,0), (10,6,0), (4,5,0), (4,6,0)}; or
{(7,5,0), (7,6,0), (1,5,0), (1,6,0), (6,5,0), (6,6,0), (0,5,0), (0,6,0)}; or
{(11,6,1), (11,7,1), (5,6,1), (5,7,1), (10,6,1), (10,7,1), (4,6,1), (4,7,1)}; or
{(7,6,1), (7,7,1), (1,6,1), (1,7,1), (6,6,1), (6,7,1), (0,6,1), (0,7,1)}.

Positions of the eight resource elements in the third resource element group are respectively denoted by the triplet (k',l',$n_s$ mod 2) as follows:
{(11,0,1), (11,1,1), (5,0,1), (5,1,1), (10,0,1), (10,1,1), (4,0,1), (4,1,1)}; or
{(9,0,1), (9,1,1), (3,0,1), (3,1,1), (8,0,1), (8,1,1), (2,0,1), (2,1,1)}; or
{(7,0,1), (7,1,1), (1,0,1), (1,1,1), (6,0,1), (6,1,1), (0,0,1), (0,1,1)}; or
{(11,3,0), (11,4,0), (5,3,0), (5,4,0), (10,3,0), (10,4,0), (4,3,0), (4,4,0)}; or
{(9,3,0), (9,4,0), (3,3,0), (3,4,0), (8,3,0), (8,4,0), (2,3,0), (2,4,0)}; or
{(7,3,0), (7,4,0), (1,3,0), (1,4,0), (6,3,0), (6,4,0), (0,3,0), (0,4,0)}.

Positions of the eight resource elements in the fourth resource element group are respectively denoted by the triplet (k',l',$n_s$ mod 2) as follows:
{(11,1,0), (11,2,0), (5,1,0), (5,2,0), (10,1,0), (10,2,0), (4,1,0), (4,2,0)}; or
{(9,1,0), (9,2,0), (3,1,0), (3,2,0), (8,1,0), (8,2,0), (2,1,0), (2,2,0)}; or
{(7,1,0), (7,2,0), (1,1,0), (1,2,0), (6,1,0), (6,2,0), (0,1,0), (0,2,0)}.

Positions of the eight resource elements in the fifth resource element group are respectively denoted by the triplet (k',l',$n_s$ mod 2) as follows:
{(11,0,1), (11,1,1), (5,0,1), (5,1,1), (10,0,1), (10,1,1), (4,0,1), (4,1,1)}; or
{(8,0,1), (8,1,1), (2,0,1), (2,1,1), (7,0,1), (7,1,1), (1,0,1), (1,1,1)}; or
{(11,3,0), (11,4,0), (5,3,0), (5,4,0), (10,3,0), (10,4,0), (4,3,0), (4,4,0)}; or
{(8,3,0), (8,4,0), (2,3,0), (2,4,0), (7,3,0), (7,4,0), (1,3,0), (1,4,0)}.

Positions of the eight resource elements in the sixth resource element group are respectively denoted by the triplet (k',l',$n_s$ mod 2) as follows:
{(11,5,0), (11,6,0), (10,5,0), (10,6,0), (11,6,1), (11,7,1), (10,6,1), (10,7,1)}; or
{(6,5,0), (6,6,0), (5,5,0), (5,6,0), (6,6,1), (6,7,1), (5,6,1), (5,7,1)}; or
{(1,5,0), (1,6,0), (0,5,0), (0,6,0), (1,2,0), (1,3,0), (0,2,0), (0,3,0)}.

Positions of the eight resource elements in the seventh resource element group are respectively denoted by the triplet (k',l',$n_s$ mod 2) as follows:
{(11,2,0), (11,3,0), (5,2,0), (5,3,0), (10,2,0), (10,3,0), (4,2,0), (4,3,0)}; or
{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the eighth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the ninth resource element group are respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the tenth resource element group are respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group are respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group are respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirteenth resource element group are respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group are respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

A fourth aspect of the present application provides a base station, including a notifying unit configured to notify a user equipment of reference signal resource configuration. The reference signal resource configuration includes reference signal port configuration, reference signal subframe configuration, and reference signal configuration. A signal sending unit is configured to send a reference signal to the user equipment according to the notified reference signal resource configuration.

With reference to the fourth aspect, in a first possible implementation manner, a subframe configured in the reference signal subframe configuration does not include one or more of the following subframes: a subframe used for transmission over a physical downlink control channel, where the physical downlink control channel carries downlink control information used for scheduling a physical downlink shared channel; a subframe used for transmission over a physical downlink shared channel; a subframe used for transmitting a demodulation reference signal (DMRS); and a subframe used for transmitting a part or entirety of cell-specific reference signals (CRS).

With reference to the fourth aspect or the first possible implementation manner of the fourth aspect, in a second possible implementation manner, a subframe configured in the reference signal subframe configuration is a multicast-broadcast single frequency network (MBSFN) subframe.

With reference to the fourth aspect, the first possible implementation manner of the fourth aspect, or the second possible implementation manner of the fourth aspect, in a third possible implementation manner, N resource elements in each physical resource block pair that are configured in the reference signal configuration and carry a reference signal are: N resource elements in M resource element groups, where each resource element group in the M resource element groups includes eight resource elements, and M is an integer greater than or equal to 2; and N is a quantity of ports configured in the reference signal port configuration, and N is greater than 8, equal to 8, or less than 8.

With reference to the third possible implementation manner of the fourth aspect, in a fourth possible implementation manner, the N resource elements in each physical resource block pair that are configured in the reference signal configuration and carry a reference signal are: N resource elements in X resource element groups in the M resource element groups, where X is a smallest integer not less than N/8, and X is a positive integer less than or equal to M.

With reference to the third possible implementation manner of the fourth aspect or the fourth possible implementation manner of the fourth aspect, in a fifth possible implementation manner, the M resource element groups include at least one of the following eight resource element groups: a first resource element group, a second resource element group, a third resource element group, a fourth resource element group, a fifth resource element group, a sixth resource element group, a seventh resource element group, and an eighth resource element group. Alternatively, the M resource element groups include at least one of the following six resource element groups: a ninth resource element group, a tenth resource element group, an eleventh resource element group, a twelfth resource element group, a thirteenth resource element group, and a fourteenth resource element group.

A position of a resource element is denoted by a triplet (k',l',$n_s$ mod 2), where in the triplet (k',l',$n_s$ mod 2), k' indicates an index of a subcarrier corresponding to the resource element in a physical resource block pair in which the resource element is located; l' indicates an index of an orthogonal frequency division multiplexing OFDM symbol corresponding to the resource element in the physical resource block pair in which the resource element is located; $n_s$ indicates an index of a timeslot in which the resource element is located; and $n_s$ mod 2 indicates a value obtained by performing a modulo-2 operation on $n_s$.

Positions of the eight resource elements in the first resource element group are respectively denoted by the triplet (k',l',$n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

Positions of the eight resource elements in the second resource element group are respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the third resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the fourth resource element group are respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the fifth resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the sixth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the seventh resource element group are respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the eighth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the ninth resource element group are respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the tenth resource element group are respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group are respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group are respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirteenth resource element group are respectively denoted by the triplet (k',l',n$_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group are respectively denoted by the triplet (k',l',n$_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

As seen from above, according to the technical solutions in the embodiments of the present application, reference signal resource configuration is determined, where the reference signal resource configuration includes reference signal port configuration, reference signal subframe configuration, and reference signal configuration, and a quantity of ports (that is, antenna ports) configured in the reference signal port configuration is N; a reference signal that is transmitted by a base station according to the reference signal resource configuration is received; and measurement is performed based on the received reference signal, so as to obtain channel state information and/or signal quality information. In the embodiments of the present application, determined network-side reference signal resource configuration includes reference signal port configuration, where a quantity of ports configured in the reference signal port configuration is N; and a quantity of supported ports may vary with different values of N (for example, if N is greater than 8, it indicates that the quantity of supported ports is greater than 8). This can improve flexibility of reference signal port configuration and help to support more antenna ports.

BRIEF DESCRIPTION OF THE DRAWINGS

To describe the technical solutions in the embodiments of the present application or in the prior art more clearly, the following briefly introduces the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

FIG. 1-a is a schematic diagram of a structure of a radio frame according to an embodiment of the present application;

FIG. 1-b is a schematic diagram of a physical resource block according to an embodiment of the present application;

FIG. 4-a is a schematic flowchart of a reference signal measurement method according to an embodiment of the present application;

FIG. 4-b to FIG. 4-j are schematic diagrams of positions of resource elements in several reference signal configurations according to embodiments of the present application;

DETAILED DESCRIPTION OF ILLUSTRATIVE EMBODIMENTS

Figure 2:
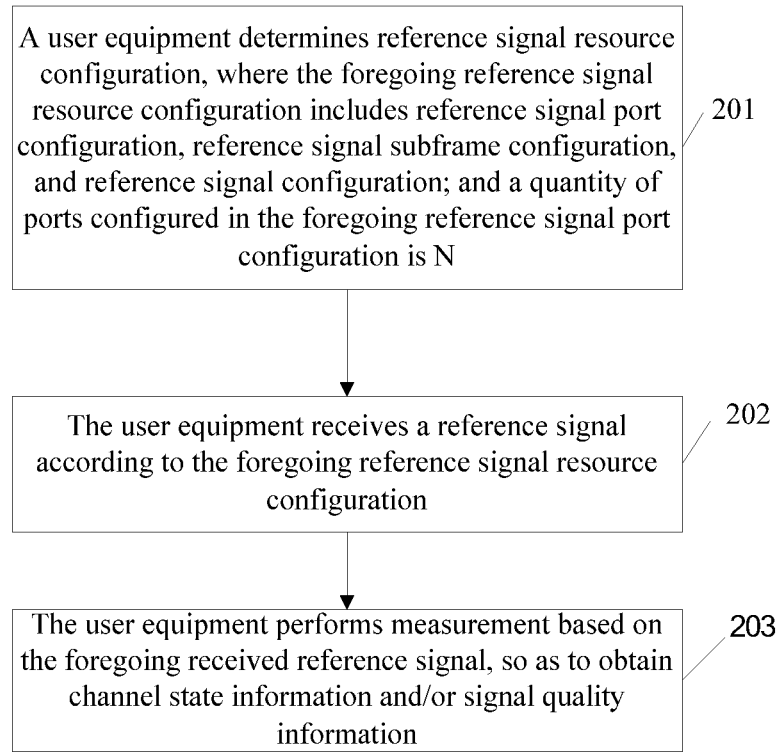
FIG. 2 is a schematic flowchart of a reference signal measurement method according to an embodiment of the present application.

Embodiments of the present application provide a reference signal measurement method, a reference signal sending method, a user equipment, and a base station, so as to flexibly support multiple antenna ports.

To make a person skilled in the art understand the technical solutions in the present application better, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

The following describes in detail the embodiments of the present application.

Terms such as "first", "second", "third", "fourth" (if any) used in the specification, claims, and the foregoing accompanying drawings of the present application are used to distinguish between similar objects, and are not necessarily used to describe a particular sequence or order. It should be understood that data used in this way may be interchangeable in an appropriate situation, so that the embodiments of the present application described herein can be implemented in another sequence in addition to those sequences illustrated or described herein. In addition, terms "include", "have", and any other variation thereof, are intended to cover a non-exclusive inclusion. For example, a process, method, system, product, or device that includes a series of steps or elements is not necessarily limited to those steps or elements expressly listed, but may include other steps or elements not expressly listed or inherent to such a process, method, product, or device.

For ease of description, the following first describes a frame structure, a timeslot structure, and a physical resource element in a 3GPP LTE downlink system. In a 3GPP LTE system, uplink transmission and downlink transmission are organized as radio frames. Each radio frame is 10 milliseconds in length and includes twenty 0.5-millisecond timeslots, and the timeslots may be sequentially numbered from 0 to 19. A subframe is defined as two consecutive timeslots. Two types of frame structures are supported in total: type 1 and type 2, which are used in an FDD system and a TDD system, respectively. Using the frame structure type 1 as an example, the frame structure is shown in FIG. 1-a.

A signal transmitted in each timeslot may be denoted by one or more resource grids. FIG. 1-b shows a resource grid structure that includes $NR_{RB}^{DL}N_{sc}^{RB}$ subcarriers and $N_{symb}^{DL}$ orthogonal frequency division multiplexing (OFDM) symbols, where NRB is system bandwidth using physical resource block (PRB) as a unit; $N_{sc}^{RB}$ is a quantity of subcarriers in one PRB; and $N_{symb}^{DL}$ is a quantity of OFDM symbols in one downlink timeslot. Each cell in a resource grid is called a resource element (RE), where each RE in a PRB may be uniquely identified by an index pair (k,l) in a timeslot; k (for example, k–0, ..., $N_{RB}^{DL}N_{sc}^{RB}-1$) is an index in a frequency domain; and l (l=0, ..., $N_{symb}^{DL}-1$) is an index in a time domain. $N_{symb}^{DL}$ consecutive OFDM symbols in a time domain and $NR_{sc}^{RB}$ consecutive subcarriers in a frequency domain form one RB; which means, one RB is formed by $N_{symb}^{DL} \times N_{sc}^{RB}$ Res and corresponds to one timeslot in a time domain and 180 kHz in a frequency domain. For ease of description, positions of a subcarrier and an OFDM symbol in each PRB or RB may be denoted by an index pair (k',l').

In an embodiment of a reference signal measurement method in the present application, the reference signal measurement method may include: determining reference signal (for example, a CSI-RS, or a reference signal of another type) resource configuration, where the reference signal resource configuration includes reference signal port configuration, reference signal subframe configuration, and reference signal configuration, and a quantity of ports configured in the reference signal port configuration is N; receiving a reference signal according to the reference signal resource configuration; and performing measurement based on the received reference signal, so as to obtain channel state information and/or signal quality information.

Referring to FIG. 2, FIG. 2 is a schematic flowchart of a reference signal measurement method according to an embodiment of the present application. As shown in FIG. 2, the reference signal measurement method provided in the embodiment of the present application may include the following content.

201. A user equipment determines reference signal resource configuration.

The foregoing reference signal resource configuration includes: reference signal port configuration, reference signal subframe configuration, and reference signal configuration; and a quantity of ports configured in the foregoing reference signal port configuration is N, where N may be greater than 8, or equal to 8, or less than 8.

It should be noted that the reference signal mentioned in the embodiment of the present application may be, for example, a CSI-RS, or a reference signal of another type.

It should be understood that the user equipment may determine, based on a notification from a base station, the reference signal port configuration, the reference signal subframe configuration, and the reference signal configuration. Certainly, a part or entirety of the configurations may also be agreed on by the base station and the user equipment by default. Therefore, the user equipment may also determine corresponding reference signal resource configuration according to the agreement (or according to the notification and the agreement).

202. The user equipment receives a reference signal according to the foregoing reference signal resource configuration.

203. The user equipment performs measurement based on the foregoing received reference signal, so as to obtain channel state information and/or signal quality information.

In some embodiments of the present application, the channel state information includes one or more pieces of the following information: a rank indicator (RI), a precoding matrix indicator (PMI), and a channel quality indicator (CQI). In some embodiments of the present application, the foregoing signal quality information includes reference signal received power (RSRP), or reference signal received quality (RSRQ), or reference signal strength (RSSI, Received Signal Strength Indicator).

In some embodiments of the present application, a subframe configured in the reference signal subframe configuration does not include: transmission over a physical downlink control channel (PDCCH) that carries downlink control information used for scheduling a physical downlink shared channel (PDSCH); and/or, the subframe configured in the reference signal subframe configuration does not include: transmission over a physical downlink shared channel; and/or, the subframe configured in the reference signal subframe configuration does not include: a demodulation reference signal (DMRS); and/or, the subframe configured in the reference signal subframe configuration does not include: a part or entirety of cell-specific reference signals (CRS).

It should be noted that, that a subframe configured in the reference signal subframe configuration does not include transmission over a physical downlink control channel (PDCCH) that carries downlink control information used for scheduling a physical downlink shared channel (PDSCH) means that the subframe configured in the reference signal subframe configuration may include or may not include transmission over a PDCCH that carries downlink control information used for scheduling a physical uplink shared channel (PUSCH).

In some embodiments of the present application, the subframe configured in the foregoing reference signal subframe configuration may not include transmission over a PDCCH that carries downlink control information used for scheduling a PDSCH and transmission over a PDCCH that carries downlink control information used for scheduling an uplink PUSCH.

In some embodiments of the present application, the subframe configured in the foregoing reference signal subframe configuration may be, for example, a multicast-broadcast single frequency network (MBSFN) subframe. Certainly, the subframe configured in the foregoing reference signal subframe configuration may be a non-MBSFN subframe, or may include a non-MBSFN subframe and an MBSFN subframe.

In some embodiments of the present application, the user equipment may obtain the reference signal subframe configuration by receiving a system message sent by the base station. For example, the user equipment may obtain the reference signal subframe configuration according to a system information block (SIB) in a received system message that is sent by the base station, where the foregoing system message sent by the base station may be area-specific, cell-specific, or user-group-specific. Alternatively, the user equipment may obtain the reference signal subframe configuration by receiving higher layer signaling sent by the base station, where the higher layer signaling may be radio resource control (RRC) signaling or other higher layer signaling.

In some embodiments of the present application, the user equipment may determine the reference signal subframe configuration by using a predefined formula. For example, the reference signal subframe configuration includes a subframe that satisfies the following relationship:

$$[(10 \cdot n_f + \lfloor n_s/2 \rfloor) \bmod T] = \Delta \quad \text{(formula 1)},$$

where $n_f$ indicates a radio frame number or a system frame number; $n_s$ indicates a timeslot (slot) number in a radio frame; T indicates a subframe period; and Δ indicates an offset. T and Δ may be predefined, for example, may be determined based on a cell identifier. In addition, the base station may also notify the UE by using higher layer signaling (for example, RRC signaling) or downlink control information. In addition, the reference signal subframe configured in the reference signal subframe configuration may include multiple subframes that satisfy formula 1. In some embodiments of the present application, the reference signal subframe configured in the foregoing reference signal subframe configuration may also be an MBSFN subframe that satisfies formula 1.

In some embodiments of the present application, N resource elements in each physical resource block pair (PRB Pair) that are configured in the foregoing reference signal configuration and carry a reference signal may be: N resource elements in M resource element groups, where each resource element group in the foregoing M resource element groups may include eight resource elements, and M is an integer greater than or equal to 2.

In some embodiments of the present application, the N resource elements in each physical resource block pair (PRB Pair) that are configured in the foregoing reference signal configuration and carry a reference signal are N resource elements in X resource element groups in the foregoing M resource element groups, where X equals an integer that is obtained by rounding up N/8, and X is a positive integer less than or equal to M.

In some embodiments of the present application, the foregoing reference signal configuration may be used to indicate a resource element and a corresponding timeslot that are occupied by a reference signal, where the resource element or timeslot occupied by the reference signal may be, for example, a resource element and a timeslot that are occupied by a CSI RS and defined in LTE R10, a combination with any other resource element and timeslot except a resource element and a timeslot that are occupied by a CSI RS and defined in LTE R10, or a combination with any other resource element and timeslot except a resource element and a timeslot that are occupied by a CSI RS and defined in LTE R10.

A position of a resource element is denoted by a triplet $(k',l',n_s \bmod 2)$, where in the triplet $(k',l',n_s \bmod 2)$ k' indicates an index of a subcarrier corresponding to the resource element in a physical resource block pair in which the resource element is located; l' indicates an index of an orthogonal frequency division multiplexing OFDM symbol corresponding to the resource element in the physical resource block pair in which the resource element is located; $n_s$ indicates an index of a timeslot in which the resource element is located; and $n_s \bmod 2$ indicates a value obtained by performing a modulo-2 operation on $n_s$.

In some embodiments of the present application, the foregoing M resource element groups may include, for example, at least one of the following eight resource element groups: a first resource element group, a second resource element group, a third resource element group, a fourth resource element group, a fifth resource element group, a sixth resource element group, a seventh resource element group, and an eighth resource element group.

Positions of the eight resource elements in the first resource element group may be respectively denoted by the triplet $(k',l',n_s \bmod 2)$ as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

For example, the resource element (9,5,0) indicates that a subcarrier corresponding to the resource element is subcarrier 9, an OFDM symbol corresponding to the resource element is OFDM symbol 5, and a timeslot corresponding to a PRB to which the resource element belongs is timeslot 0 in a corresponding subframe. The rest may be deduced by analogy.

Positions of the eight resource elements in the second resource element group may be respectively denoted by the triplet $(k',l',n_s \bmod 2)$ as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the third resource element group may be respectively denoted by the triplet $(k',l',n_s \bmod 2)$ as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the fourth resource element group may be respectively denoted by the triplet $(k',l',n_s \bmod 2)$ as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the fifth resource element group may be respectively denoted by the triplet $(k',l',n_s \bmod 2)$ as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the sixth resource element group may be respectively denoted by the triplet $(k',l',n_s \bmod 2)$ as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the seventh resource element group may be respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the eighth resource element group may be respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

In some embodiments of the present application, the foregoing M resource element groups may include, for example, at least one of the following six resource element groups: a ninth resource element group, a tenth resource element group, an eleventh resource element group, a twelfth resource element group, a thirteenth resource element group, and a fourteenth resource element group.

Positions of the eight resource elements in the ninth resource element group may be respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the tenth resource element group may be respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group may be respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group may be respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirteenth resource element group may be respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group may be respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

In some embodiments of the present application, the channel state information may further be obtained based on a zero-power reference signal in an interference measurement resource, where resource elements included in each physical resource block pair (PRB Pair) in the foregoing interference measurement resource include at least one of the following eight resource element groups: a twenty-first resource element group, a twenty-second resource element group, a twenty-third resource element group, a twenty-fourth resource element group, a twenty-fifth resource element group, a twenty-sixth resource element group, a twenty-seventh resource element group, and a twenty-eighth resource element group. Alternatively, resource elements included in each physical resource block pair (PRB Pair) in the interference measurement resource include at least one of the following six resource element groups: a twenty-ninth resource element group, a thirtieth resource element group, a thirty-first resource element group, a thirty-second resource element group, a thirty-third resource element group, and a thirty-fourth resource element group.

Positions of the eight resource elements in the twenty-first resource element group are respectively denoted by the triplet (k',l',$n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

Positions of the eight resource elements in the twenty-second resource element group are respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the twenty-third resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or
{(7,0,1), (7,1,1), (1,0,1), (1,1,1), (6,0,1), (6,1,1), (0,0,1), (0,1,1)}; or
{(11,3,0), (11,4,0), (5,3,0), (5,4,0), (10,3,0), (10,4,0), (4,3,0), (4,4,0)}; or
{(9,3,0), (9,4,0), (3,3,0), (3,4,0), (8,3,0), (8,4,0), (2,3,0), (2,4,0)}; or
{(7,3,0), (7,4,0), (1,3,0), (1,4,0), (6,3,0), (6,4,0), (0,3,0), (0,4,0)}.

Positions of the eight resource elements in the twenty-fourth resource element group are respectively denoted by the triplet (k',l',$n_s$ mod 2) as follows:
{(11,1,0), (11,2,0), (5,1,0), (5,2,0), (10,1,0), (10,2,0), (4,1,0), (4,2,0)}; or
{(9,1,0), (9,2,0), (3,1,0), (3,2,0), (8,1,0), (8,2,0), (2,1,0), (2,2,0)}; or
{(7,1,0), (7,2,0), (1,1,0), (1,2,0), (6,1,0), (6,2,0), (0,1,0), (0,2,0)}.

Positions of the eight resource elements in the twenty-fifth resource element group are respectively denoted by the triplet (k',l',$n_s$ mod 2) as follows:
{(11,0,1), (11,1,1), (5,0,1), (5,1,1), (10,0,1), (10,1,1), (4,0,1), (4,1,1)}; or
{(8,0,1), (8,1,1), (2,0,1), (2,1,1), (7,0,1), (7,1,1), (1,0,1), (1,1,1)}; or
{(11,3,0), (11,4,0), (5,3,0), (5,4,0), (10,3,0), (10,4,0), (4,3,0), (4,4,0)}; or
{(8,3,0), (8,4,0), (2,3,0), (2,4,0), (7,3,0), (7,4,0), (1,3,0), (1,4,0)}.

Positions of the eight resource elements in the twenty-sixth resource element group are respectively denoted by the triplet (k',l',$n_s$ mod 2) as follows:
{(11,5,0), (11,6,0), (10,5,0), (10,6,0), (11,6,1), (11,7,1), (10,6,1), (10,7,1)}; or
{(6,5,0), (6,6,0), (5,5,0), (5,6,0), (6,6,1), (6,7,1), (5,6,1), (5,7,1)}; or
{(1,5,0), (1,6,0), (0,5,0), (0,6,0), (1,2,0), (1,3,0), (0,2,0), (0,3,0)}.

Positions of the eight resource elements in the twenty-seventh resource element group are respectively denoted by the triplet (k',l',$n_s$ mod 2) as follows:
{(11,2,0), (11,3,0), (5,2,0), (5,3,0), (10,2,0), (10,3,0), (4,2,0), (4,3,0)}; or
{(9,2,0), (9,3,0), (3,2,0), (3,3,0), (8,2,0), (8,3,0), (2,2,0), (2,3,0)}; or
{(7,2,0), (7,3,0), (1,2,0), (1,3,0), (6,2,0), (6,3,0), (0,2,0), (0,3,0)}.

Positions of the eight resource elements in the twenty-eighth resource element group are respectively denoted by the triplet (k',l',$n_s$ mod 2) as follows:
{(11,5,0), (11,6,0), (10,5,0), (10,6,0), (11,6,1), (11,7,1), (10,6,1), (10,7,1)}; or
{(6,5,0), (6,6,0), (5,5,0), (5,6,0), (6,6,1), (6,7,1), (5,6,1), (5,7,1)}; or
{(1,5,0), (1,6,0), (0,5,0), (0,6,0), (1,2,0), (1,3,0), (0,2,0), (0,3,0)}.

Positions of the eight resource elements in the twenty-ninth resource element group are respectively denoted by the triplet (k',l',$n_s$ mod 2) as follows:
{(11,4,0), (11,5,0), (8,4,0), (8,5,0), (5,4,0), (5,5,0), (2,4,0), (2,5,0)}; or
{(9,4,0), (9,5,0), (6,4,0), (6,5,0), (3,4,0), (3,5,0), (0,4,0), (0,5,0)}; or
{(10,4,1), (10,5,1), (7,4,1), (7,5,1), (4,4,1), (4,5,1), (1,4,1), (1,5,1)}; or
{(9,4,1), (9,5,1), (6,4,1), (6,5,1), (3,4,1), (3,5,1), (0,4,1), (0,5,1)}.

Positions of the eight resource elements in the thirtieth resource element group are respectively denoted by the triplet (k',l',$n_s$ mod 2) as follows:
{(11,5,1), (11,6,1), (8,5,1), (8,6,1), (5,5,1), (5,6,1), (2,5,1), (2,6,1)}; or
{(10,4,0), (10,5,0), (7,4,0), (7,5,0), (4,4,0), (4,5,0), (1,4,0), (1,5,0)}.

Positions of the eight resource elements in the thirty-first resource element group are respectively denoted by the triplet (k',l',$n_s$ mod 2) as follows:
{(11,0,1), (11,1,1), (8,0,1), (8,1,1), (5,0,1), (5,1,1), (2,0,1), (2,1,1)}; or
{(11,2,1), (11,3,1), (8,2,1), (8,3,1), (5,2,1), (5,3,1), (2,2,1), (2,3,1)}; or
{(10,0,1), (10,1,1), (7,0,1), (7,1,1), (4,0,1), (4,1,1), (1,0,1), (1,1,1)}; or
{(10,2,1), (10,3,1), (7,2,1), (7,3,1), (4,2,1), (4,3,1), (1,2,1), (1,3,1)}; or
{(11,1,1), (11,2,1), (8,1,1), (8,2,1), (5,1,1), (5,2,1), (2,1,1), (2,2,1)}; or
{(10,1,1), (10,2,1), (7,1,1), (7,2,1), (4,1,1), (4,2,1), (1,1,1), (1,2,1)}.

Positions of the eight resource elements in the thirty-second resource element group are respectively denoted by the triplet (k',l',$n_s$ mod 2) as follows:
{(9,1,1), (9,2,1), (6,1,1), (6,2,1), (3,1,1), (3,2,1), (0,1,1), (0,2,1)}.

Positions of the eight resource elements in the thirty-third resource element group are respectively denoted by the triplet (k',l',$n_s$ mod 2) as follows:
{(11,1,0), (11,2,0), (8,1,0), (8,2,0), (5,1,0), (5,2,0), (2,1,0), (2,2,0)}; or
{(10,1,0), (10,2,0), (7,1,0), (7,2,0), (4,1,0), (4,2,0), (1,1,0), (1,2,0)}; or
{(9,1,0), (9,2,0), (6,1,0), (6,2,0), (3,1,0), (3,2,0), (0,1,0), (0,2,0)}.

Positions of the eight resource elements in the thirty-fourth resource element group are respectively denoted by the triplet (k',l',$n_s$ mod 2) as follows:
{(11,2,0), (11,3,0), (8,2,0), (8,3,0), (5,2,0), (5,3,0), (2,2,0), (2,3,0)}; or
{(10,2,0), (10,3,0), (7,2,0), (7,3,0), (4,2,0), (4,3,0), (1,2,0), (1,3,0)}; or
{(9,2,0), (9,3,0), (6,2,0), (6,3,0), (3,2,0), (3,3,0), (0,2,0), (0,3,0)}.

A resource element occupied by a zero-power reference signal and a resource element occupied by a non-zero-power reference signal may overlap or may not overlap.

The foregoing are examples of positions of resource elements, and an actual application is not limited to the foregoing examples.

As seen from above, in the embodiment of the present application, the user equipment determines reference signal resource configuration, where the reference signal resource configuration includes reference signal port configuration, reference signal subframe configuration, and reference signal configuration, and a quantity of ports (that is, antenna ports) configured in the reference signal port configuration is N; receives a reference signal that is transmitted by a base station according to the reference signal resource configuration; and performs measurement based on the received reference signal, so as to obtain channel state information and/or signal quality information. In the embodiment of the present application, determined network-side reference signal resource configuration includes reference signal port configuration, where a quantity of ports configured in the reference signal port configuration is N; and a quantity of supported ports may vary with different values of N (for example, if N is greater than 8, it indicates that the quantity of supported ports is greater than 8). This can improve flexibility of reference signal port configuration and help to support more antenna ports. Further, multiple selectable resource elements in new positions are used to send reference signals, which helps to obtain higher gain and reduce interference.

In an embodiment of the reference signal sending method in the present application, the reference signal sending method may include: notifying a user equipment of reference signal resource configuration, where the foregoing reference signal resource configuration includes reference signal port configuration, reference signal subframe configuration, and reference signal configuration, and a quantity of ports configured in the foregoing reference signal port configuration is N; and sending a reference signal to the foregoing user equipment according to the foregoing notified reference signal resource configuration, where N may be greater than 8, or equal to 8, or less than 8.

Figure 3:
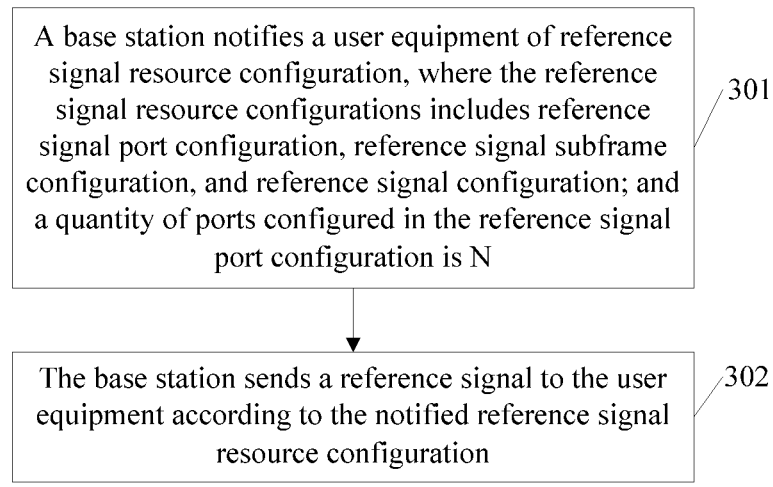
FIG. 3 is a schematic flowchart of a reference signal sending method according to an embodiment of the present application.

Referring to FIG. 3, FIG. 3 is a schematic flowchart of a reference signal sending method according to an embodiment of the present application. As shown in FIG. 3, the reference signal sending method provided in the embodiment of the present application may include the following content.

301. A base station notifies a user equipment of reference signal resource configuration, where the reference signal resource configuration includes reference signal port configuration, reference signal subframe configuration, and reference signal configuration; and a quantity of ports configured in the reference signal port configuration is N, where N may be greater than 8, or equal to 8, or less than 8.

302. The base station sends a reference signal to the user equipment according to the notified reference signal resource configuration.

In some embodiments of the present application, a subframe configured in the reference signal subframe configuration does not include: transmission over a PDCCH that carries downlink control information used for scheduling a PDSCH; and/or, the subframe configured in the reference signal subframe configuration does not include: transmission over a physical downlink shared channel; and/or, the subframe configured in the reference signal subframe configuration does not include: a demodulation reference signal (DMRS); and/or, the subframe configured in the reference signal subframe configuration does not include: a part or entirety of cell-specific reference signals (CRS).

It should be noted that, that a subframe configured in the reference signal subframe configuration does not include transmission over a PDCCH that carries downlink control information used for scheduling a PDSCH means that the subframe configured in the reference signal subframe configuration may include or may not include transmission over a PDCCH that carries downlink control information used for scheduling a PUSCH.

In some embodiments of the present application, the subframe configured in the foregoing reference signal subframe configuration may not include transmission over a PDCCH that carries downlink control information used for scheduling a PDSCH and transmission over a PDCCH that carries downlink control information used for scheduling an uplink PUSCH.

In some embodiments of the present application, the user equipment may obtain the reference signal subframe configuration by receiving a system message sent by the base station. For example, the user equipment may obtain the reference signal subframe configuration according to a system information block (SIB) in a received system message that is sent by the base station, where the foregoing system message sent by the base station may be area-specific, cell-specific, or user-group-specific. Alternatively, the user equipment may obtain the reference signal subframe configuration by receiving higher layer signaling sent by the base station, where the higher layer signaling may be radio resource control (RRC) signaling or other higher layer signaling.

In some embodiments of the present application, the subframe configured in the foregoing reference signal subframe configuration may be, for example, a multicast-broadcast single frequency network (MBSFN) subframe. Certainly, the subframe configured in the foregoing reference signal subframe configuration may be a non-MBSFN subframe, or may include a non-MBSFN subframe and an MBSFN subframe.

In some embodiments of the present application, the user equipment may determine the reference signal subframe configuration by using a predefined formula. For example, the reference signal subframe configuration includes a subframe that satisfies the following relationship:

$$[(10 \cdot n_f + \lfloor n_s/2 \rfloor) \bmod T] = \Delta \qquad \text{(formula 1)},$$

where $n_f$ indicates a radio frame number or a system frame number; $n_s$ indicates a timeslot (slot) number in a radio frame; T indicates a subframe period; and $\Delta$ indicates an offset. T and $\Delta$ may be predefined, for example, may be determined based on a cell identifier. In addition, the base station may also notify the UE by using higher layer signaling (for example, RRC signaling) or downlink control information. In addition, the reference signal subframe configured in the reference signal subframe configuration may include multiple subframes that satisfy formula 1. In some embodiments of the present application, the reference signal subframe configured in the foregoing reference signal subframe configuration may also be an MBSFN subframe that satisfies formula 1.

In some embodiments of the present application, N resource elements in each physical resource block pair (PRB Pair) that are configured in the foregoing reference signal configuration and carry a reference signal may be: N resource elements in M resource element groups, where each resource element group in the foregoing M resource element groups may include eight resource elements, and M is an integer greater than or equal to 2.

In some embodiments of the present application, the N resource elements in each physical resource block pair (PRB Pair) that are configured in the foregoing reference signal configuration and carry a reference signal are N resource elements in X resource element groups in the foregoing M resource element groups, where X equals an integer that is obtained by rounding up N/8, and X is a positive integer less than or equal to M.

In some embodiments of the present application, the foregoing reference signal configuration may be used to indicate a resource element and a corresponding timeslot that are occupied by a reference signal, where the resource element or timeslot occupied by the reference signal may be, for example, a resource element and a timeslot that are occupied by a CSI RS and defined in LTE R10, a combination with any other resource element and timeslot except a resource element and a timeslot that are occupied by a CSI RS and defined in LTE R10, or a combination with any other resource element and timeslot except a resource element and a timeslot that are occupied by a CSI RS and defined in LTE R10.

A position of a resource element is denoted by a triplet (k',l',$n_s$ mod 2), where in the triplet (k',l',$n_s$ mod 2), k' indicates an index of a subcarrier corresponding to the resource element in a physical resource block pair in which the resource element is located; l' indicates an index of an orthogonal frequency division multiplexing OFDM symbol corresponding to the resource element in the physical resource block pair in which the resource element is located; $n_s$ indicates an index of a timeslot in which the resource element is located; and $n_s$ mod 2 indicates a value obtained by performing a modulo-2 operation on $n_s$.

In some embodiments of the present application, the foregoing M resource element groups may include, for example, at least one of the following eight resource element groups: a first resource element group, a second resource element group, a third resource element group, a fourth resource element group, a fifth resource element group, a sixth resource element group, a seventh resource element group, and an eighth resource element group.

Positions of the eight resource elements in the first resource element group may be respectively denoted by the triplet (k',l',$n_s$ mod 2) as follows:
{(9,5,0), (9,6,0), (3,5,0), (3,6,0), (8,5,0), (8,6,0), (2,5,0), (2,6,0)}; or
{(11,2,1), (11,3,1), (5,2,1), (5,3,1), (10,2,1), (10,3,1), (4,2,1), (4,3,1)}; or
{(9,2,1), (9,3,1), (3,2,1), (3,3,1), (8,2,1), (8,3,1), (2,2,1), (2,3,1)}; or
{(7,2,1), (7,3,1), (1,2,1), (1,3,1), (6,2,1), (6,3,1), (0,2,1), (0,3,1)}; or
{(9,5,1), (9,6,1), (3,5,1), (3,6,1), (8,5,1), (8,6,1), (2,5,1), (2,6,1)}.

For example, the resource element (9,5,0) indicates that a subcarrier corresponding to the resource element is subcarrier 9, an OFDM symbol corresponding to the resource element is OFDM symbol 5, and a timeslot corresponding to a PRB to which the resource element belongs is timeslot 0 in a corresponding subframe. The rest may be deduced by analogy.

Positions of the eight resource elements in the second resource element group may be respectively denoted by the triplet (k',l',$n_s$ mod 2) as follows:
{(11,5,0), (11,6,0), (5,5,0), (5,6,0), (10,5,0), (10,6,0), (4,5,0), (4,6,0)}; or
{(7,5,0), (7,6,0), (1,5,0), (1,6,0), (6,5,0), (6,6,0), (0,5,0), (0,6,0)}; or
{(11,6,1), (11,7,1), (5,6,1), (5,7,1), (10,6,1), (10,7,1), (4,6,1), (4,7,1)}; or
{(7,6,1), (7,7,1), (1,6,1), (1,7,1), (6,6,1), (6,7,1), (0,6,1), (0,7,1)}.

Positions of the eight resource elements in the third resource element group may be respectively denoted by the triplet (k',l',$n_s$ mod 2) as follows:
{(11,0,1), (11,1,1), (5,0,1), (5,1,1), (10,0,1), (10,1,1), (4,0,1), (4,1,1)}; or
{(9,0,1), (9,1,1), (3,0,1), (3,1,1), (8,0,1), (8,1,1), (2,0,1), (2,1,1)}; or
{(7,0,1), (7,1,1), (1,0,1), (1,1,1), (6,0,1), (6,1,1), (0,0,1), (0,1,1)}; or
{(11,3,0), (11,4,0), (5,3,0), (5,4,0), (10,3,0), (10,4,0), (4,3,0), (4,4,0)}; or
{(9,3,0), (9,4,0), (3,3,0), (3,4,0), (8,3,0), (8,4,0), (2,3,0), (2,4,0)}; or
{(7,3,0), (7,4,0), (1,3,0), (1,4,0), (6,3,0), (6,4,0), (0,3,0), (0,4,0)}.

Positions of the eight resource elements in the fourth resource element group may be respectively denoted by the triplet (k',l',$n_s$ mod 2) as follows:
{(11,1,0), (11,2,0), (5,1,0), (5,2,0), (10,1,0), (10,2,0), (4,1,0), (4,2,0)}; or
{(9,1,0), (9,2,0), (3,1,0), (3,2,0), (8,1,0), (8,2,0), (2,1,0), (2,2,0)}; or
{(7,1,0), (7,2,0), (1,1,0), (1,2,0), (6,1,0), (6,2,0), (0,1,0), (0,2,0)}.

Positions of the eight resource elements in the fifth resource element group may be respectively denoted by the triplet (k',l',$n_s$ mod 2) as follows:
{(11,0,1), (11,1,1), (5,0,1), (5,1,1), (10,0,1), (10,1,1), (4,0,1), (4,1,1)}; or
{(8,0,1), (8,1,1), (2,0,1), (2,1,1), (7,0,1), (7,1,1), (1,0,1), (1,1,1)}; or
{(11,3,0), (11,4,0), (5,3,0), (5,4,0), (10,3,0), (10,4,0), (4,3,0), (4,4,0)}; or
{(8,3,0), (8,4,0), (2,3,0), (2,4,0), (7,3,0), (7,4,0), (1,3,0), (1,4,0)}.

Positions of the eight resource elements in the sixth resource element group may be respectively denoted by the triplet (k',l',$n_s$ mod 2) as follows:
{(11,5,0), (11,6,0), (10,5,0), (10,6,0), (11,6,1), (11,7,1), (10,6,1), (10,7,1)}; or
{(6,5,0), (6,6,0), (5,5,0), (5,6,0), (6,6,1), (6,7,1), (5,6,1), (5,7,1)}; or
{(1,5,0), (1,6,0), (0,5,0), (0,6,0), (1,2,0), (1,3,0), (0,2,0), (0,3,0)}.

Positions of the eight resource elements in the seventh resource element group may be respectively denoted by the triplet (k',l',$n_s$ mod 2) as follows:
{(11,2,0), (11,3,0), (5,2,0), (5,3,0), (10,2,0), (10,3,0), (4,2,0), (4,3,0)}; or
{(9,2,0), (9,3,0), (3,2,0), (3,3,0), (8,2,0), (8,3,0), (2,2,0), (2,3,0)}; or
{(7,2,0), (7,3,0), (1,2,0), (1,3,0), (6,2,0), (6,3,0), (0,2,0), (0,3,0)}.

Positions of the eight resource elements in the eighth resource element group may be respectively denoted by the triplet (k',l',$n_s$ mod 2) as follows:
{(11,5,0), (11,6,0), (10,5,0), (10,6,0), (11,6,1), (11,7,1), (10,6,1), (10,7,1)}; or
{(6,5,0), (6,6,0), (5,5,0), (5,6,0), (6,6,1), (6,7,1), (5,6,1), (5,7,1)}; or
{(1,5,0), (1,6,0), (0,5,0), (0,6,0), (1,2,0), (1,3,0), (0,2,0), (0,3,0)}.

In some embodiments of the present application, the foregoing M resource element groups may include, for example, at least one of the following six resource element groups: a ninth resource element group, a tenth resource element group, an eleventh resource element group, a twelfth resource element group, a thirteenth resource element group, and a fourteenth resource element group.

Positions of the eight resource elements in the ninth resource element group may be respectively denoted by the triplet (k',l',$n_s$ mod 2) as follows:
{(11,4,0), (11,5,0), (8,4,0), (8,5,0), (5,4,0), (5,5,0), (2,4,0), (2,5,0)}; or
{(9,4,0), (9,5,0), (6,4,0), (6,5,0), (3,4,0), (3,5,0), (0,4,0), (0,5,0)}; or
{(10,4,1), (10,5,1), (7,4,1), (7,5,1), (4,4,1), (4,5,1), (1,4,1), (1,5,1)}; or
{(9,4,1), (9,5,1), (6,4,1), (6,5,1), (3,4,1), (3,5,1), (0,4,1), (0,5,1)}.

Positions of the eight resource elements in the tenth resource element group may be respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group may be respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group may be respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirteenth resource element group may be respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group may be respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

In some embodiments of the present application, the channel state information may further be obtained based on a zero-power reference signal in an interference measurement resource, where resource elements included in each physical resource block pair (PRB Pair) in the foregoing interference measurement resource include at least one of the following eight resource element groups: a twenty-first resource element group, a twenty-second resource element group, a twenty-third resource element group, a twenty-fourth resource element group, a twenty-fifth resource element group, a twenty-sixth resource element group, a twenty-seventh resource element group, and a twenty-eighth resource element group. Alternatively, resource elements included in each physical resource block pair (PRB Pair) in the interference measurement resource include at least one of the following six resource element groups: a twenty-ninth resource element group, a thirtieth resource element group, a thirty-first resource element group, a thirty-second resource element group, a thirty-third resource element group, and a thirty-fourth resource element group.

Positions of the eight resource elements in the twenty-first resource element group are respectively denoted by the triplet (k',l',$n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

Positions of the eight resource elements in the twenty-second resource element group are respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the twenty-third resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the twenty-fourth resource element group are respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the twenty-fifth resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the twenty-sixth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-seventh resource element group are respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the twenty-eighth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-ninth resource element group are respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the thirtieth resource element group are respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the thirty-first resource element group are respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the thirty-second resource element group are respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirty-third resource element group are respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the thirty-fourth resource element group are respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

A resource element occupied by a zero-power reference signal and a resource element occupied by a non-zero-power reference signal may overlap or may not overlap.

The foregoing are examples of positions of resource elements, and an actual application is not limited to the foregoing examples.

In some embodiments of the present application, the user equipment may perform measurement based on the foregoing received reference signal, so as to obtain channel state information and/or reference signal transmit power. The user equipment may report the obtained channel state information and/or reference signal transmit power, or the like, to the base station.

In some embodiments of the present application, the channel state information includes an RI, or a PMI, or a CQI.

In some embodiments of the present application, the foregoing signal quality information includes RSRP, or RSR, or an RSSI, or the like.

As seen from above, in the embodiment of the present application, a base station notifies a user equipment of reference signal resource configuration, where the foregoing reference signal resource configuration includes reference signal port configuration, reference signal subframe configuration, and reference signal configuration, and a quantity of ports configured in the foregoing reference signal port configuration is N; and sends a reference signal to the foregoing user equipment according to the foregoing notified reference signal resource configuration. In the embodiment of the present application, the reference signal resource configuration of the base station includes reference signal port configuration, where a quantity of ports configured in the reference signal port configuration is N; and a quantity of supported ports may vary with different values of N (for example, if N is greater than 8, it indicates that the quantity of supported ports is greater than 8). This can improve flexibility of reference signal port configuration and help to support more antenna ports.

Further, multiple selectable resource elements in new positions are used to send reference signals, which helps to obtain higher gain and reduce interference.

For a better understanding and implementation of the foregoing solutions in the embodiments of the present application, the following uses an example of an application scenario for description.

Figure 4:
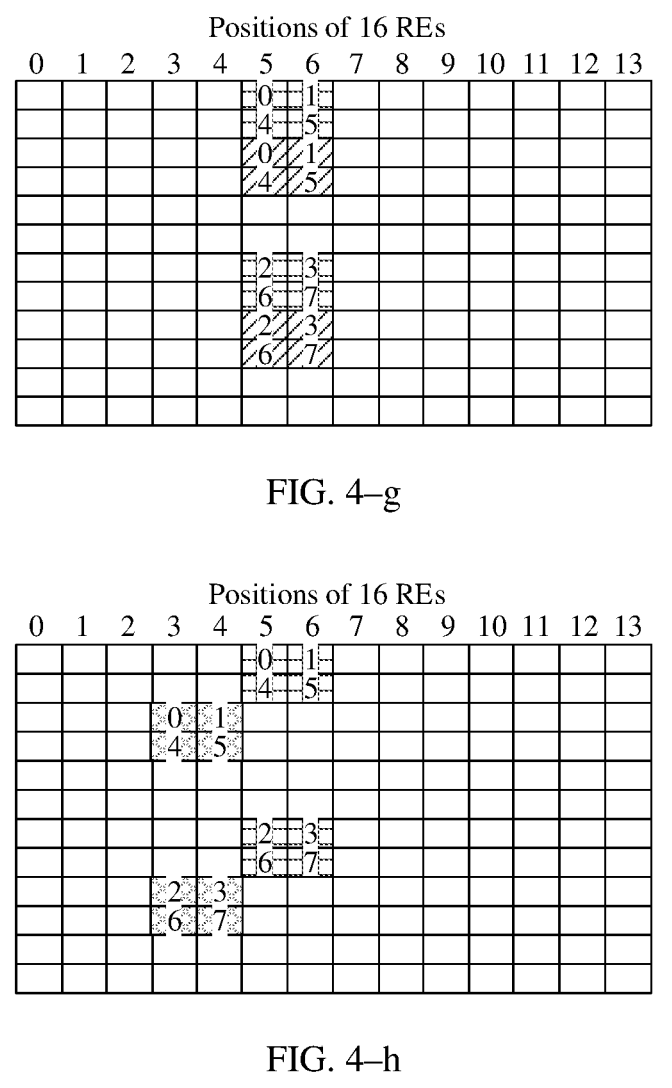
Figure 4:
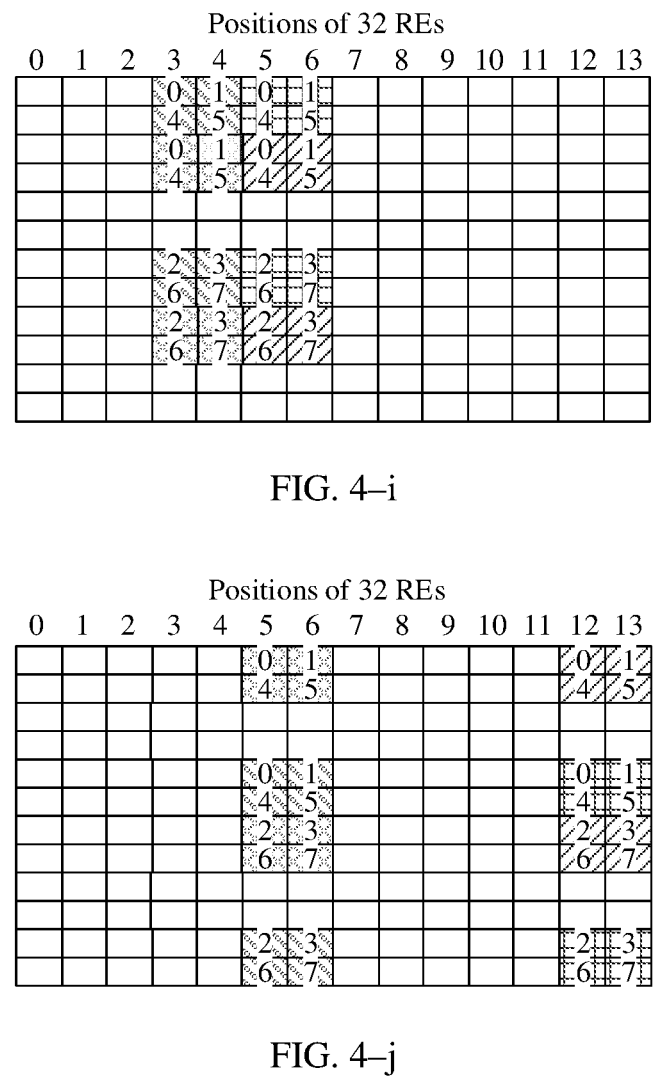

Referring to FIG. 4-a, FIG. 4-a is a schematic flowchart of a reference signal measurement method according to an embodiment of the present application. As shown in FIG. 4-a, the reference signal sending method provided in the embodiment of the present application may include the following content.

401. A base station notifies a user equipment of reference signal resource configuration.

The reference signal resource configuration includes reference signal port configuration, reference signal subframe configuration, and reference signal configuration; and a quantity of ports configured in the reference signal port configuration is N, where N may be greater than 8, or equal to 8, or less than 8.

It should be understood that the user equipment may determine, based on a notification from a base station, the reference signal port configuration, the reference signal subframe configuration, and the reference signal configuration. Certainly, a part or entirety of the configurations may also be agreed on by the base station and the user equipment by default. Therefore, the user equipment may also determine corresponding reference signal resource configuration according to the agreement (or according to the notification and the agreement).

In some embodiments of the present application, a subframe configured in the reference signal subframe configuration does not include: transmission over a PDCCH that carries downlink control information used for scheduling a PDSCH; and/or, the subframe configured in the reference signal subframe configuration does not include: transmission over a physical downlink shared channel; and/or, the subframe configured in the reference signal subframe configuration does not include: a demodulation reference signal (DMRS); and/or, the subframe configured in the reference signal subframe configuration does not include: a part or entirety of cell-specific reference signals (CRS).

It should be noted that, that a subframe configured in the reference signal subframe configuration does not include transmission over a PDCCH that carries downlink control information used for scheduling a PDSCH means that the subframe configured in the reference signal subframe configuration may include or may not include transmission over a PDCCH that carries downlink control information used for scheduling a PUSCH.

In some embodiments of the present application, the subframe configured in the foregoing reference signal subframe configuration may not include transmission over a PDCCH that carries downlink control information used for scheduling a PDSCH and transmission over a PDCCH that carries downlink control information used for scheduling an uplink PUSCH.

In some embodiments of the present application, the user equipment may obtain the reference signal subframe configuration by receiving a system message sent by the base station. For example, the user equipment may obtain the reference signal subframe configuration according to a system information block (SIB) in a received system message that is sent by the base station, where the foregoing system message sent by the base station may be area-specific, cell-specific, or user-group-specific. Alternatively, the user equipment may obtain the reference signal subframe configuration by receiving higher layer signaling sent by the base station, where the higher layer signaling may be radio resource control (RRC) signaling or other higher layer signaling.

In some embodiments of the present application, the subframe configured in the foregoing reference signal subframe configuration may be, for example, a multicast-broadcast single frequency network (MBSFN) subframe. Certainly, the subframe configured in the foregoing reference signal subframe configuration may be a non-MBSFN subframe, or may include a non-MBSFN subframe and an MBSFN subframe.

In some embodiments of the present application, the user equipment may determine the reference signal subframe configuration by using a predefined formula. For example, the reference signal subframe configuration includes a subframe that satisfies the following relationship:

$$[(10 \cdot n_f + \lfloor n_s/2 \rfloor) \bmod T] = \Delta \quad \text{(formula 1)},$$

where $n_f$ indicates a radio frame number or a system frame number; $n_s$ indicates a timeslot (slot) number in a radio frame; T indicates a subframe period; and $\Delta$ indicates an offset. T and $\Delta$ may be predefined, for example, may be determined based on a cell identifier. In addition, the base station may also notify the UE by using higher layer signaling (for example, RRC signaling) or downlink control information. In addition, the reference signal subframe configured in the reference signal subframe configuration may include multiple subframes that satisfy formula 1. In some embodiments of the present application, the reference signal subframe configured in the foregoing reference signal subframe configuration may also be an MBSFN subframe that satisfies formula 1.

In some embodiments of the present application, N resource elements in each physical resource block pair (PRB Pair) that are configured in the foregoing reference signal configuration and carry a reference signal may be: N resource elements in M resource element groups, where each resource element group in the foregoing M resource element groups may include eight resource elements, and M is an integer greater than or equal to 2.

In some embodiments of the present application, the N resource elements in each physical resource block pair (PRB Pair) that are configured in the foregoing reference signal configuration and carry a reference signal are N resource elements in X resource element groups in the foregoing M resource element groups, where X equals an integer that is obtained by rounding up N/8, and X is a positive integer less than or equal to M.

In some embodiments of the present application, the foregoing reference signal configuration may be used to indicate a resource element and a corresponding timeslot that are occupied by a reference signal, where the resource element or timeslot occupied by the reference signal may be, for example, a resource element and a timeslot that are occupied by a CSI RS and defined in LTE R10, a combination with any other resource element and timeslot except a resource element and a timeslot that are occupied by a CSI RS and defined in LTE R10, or a combination with any other resource element and timeslot except a resource element and a timeslot that are occupied by a CSI RS and defined in LTE R10.

A position of a resource element is denoted by a triplet $(k',l',n_s \bmod 2)$, where in the triplet $(k',l',n_s \bmod 2)$, k' indicates an index of a subcarrier corresponding to the resource element in a physical resource block pair in which the resource element is located; l' indicates an index of an orthogonal frequency division multiplexing OFDM symbol corresponding to the resource element in the physical resource block pair in which the resource element is located; $n_s$ indicates an index of a timeslot in which the resource element is located; and $n_s \bmod 2$ indicates a value obtained by performing a modulo-2 operation on $n_s$.

In some embodiments of the present application, the foregoing M resource element groups may include, for example, at least one of the following eight resource element groups: a first resource element group, a second resource element group, a third resource element group, a fourth resource element group, a fifth resource element group, a sixth resource element group, a seventh resource element group, and an eighth resource element group.

Positions of the eight resource elements in the first resource element group may be respectively denoted by the triplet $(k',l',n_s \bmod 2)$ as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

For example, the resource element (9,5,0) indicates that a subcarrier corresponding to the resource element is subcarrier 9, an OFDM symbol corresponding to the resource element is OFDM symbol 5, and a timeslot corresponding to a PRB to which the resource element belongs is timeslot 0 in a corresponding subframe. The rest may be deduced by analogy.

Positions of the eight resource elements in the second resource element group may be respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the third resource element group may be respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the fourth resource element group may be respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the fifth resource element group may be respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the sixth resource element group may be respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the seventh resource element group may be respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the eighth resource element group may be respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

In some embodiments of the present application, the foregoing M resource element groups may include, for example, at least one of the following six resource element groups: a ninth resource element group, a tenth resource element group, an eleventh resource element group, a twelfth resource element group, a thirteenth resource element group, and a fourteenth resource element group.

Positions of the eight resource elements in the ninth resource element group may be respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the tenth resource element group may be respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group may be respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group may be respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirteenth resource element group may be respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group may be respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

In some embodiments of the present application, the channel state information may further be obtained based on a zero-power reference signal in an interference measurement resource, where resource elements included in each physical resource block pair (PRB Pair) in the foregoing interference measurement resource include at least one of the following eight resource element groups: a twenty-first resource element group, a twenty-second resource element group, a twenty-third resource element group, a twenty-fourth resource element group, a twenty-fifth resource element group, a twenty-sixth resource element group, a twenty-seventh resource element group, and a twenty-eighth resource element group. Alternatively, resource elements included in each physical resource block pair (PRB Pair) in the interference measurement resource include at least one of the following six resource element groups: a twenty-ninth resource element group, a thirtieth resource element group, a thirty-first resource element group, a thirty-second resource element group, a thirty-third resource element group, and a thirty-fourth resource element group.

Positions of the eight resource elements in the twenty-first resource element group are respectively denoted by the triplet (k',l',$n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

Positions of the eight resource elements in the twenty-second resource element group are respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the twenty-third resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the twenty-fourth resource element group are respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the twenty-fifth resource element group are respectively denoted by the triplet (k',l',$n_s$ mod 2) as follows:

{(11,0,1), (11,1,1), (5,0,1), (5,1,1), (10,0,1), (10,1,1), (4,0,1), (1,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the twenty-sixth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-seventh resource element group are respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the twenty-eighth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-ninth resource element group are respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the thirtieth resource element group are respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the thirty-first resource element group are respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the thirty-second resource element group are respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirty-third resource element group are respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the thirty-fourth resource element group are respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

A resource element occupied by a zero-power reference signal and a resource element occupied by a non-zero-power reference signal may overlap or may not overlap.

A resource element occupied by a zero-power reference signal and a resource element occupied by a non-zero-power reference signal may overlap or may not overlap.

For example, assuming that 16 antenna ports are configured in the reference signal port configuration, 16 resource elements in each physical resource block pair that are configured in the reference signal configuration and carry a reference signal include, for example, the eight resource elements in the first resource element group and the eight resource elements in the second resource element group, 16 resource elements in total; or may include: the eight resource elements in the first resource element group, four resource elements (for example, (11,4,0), (11,5,0), (8,4,0), (8,5,0)) in the ninth resource element group, and four resource elements (for example, (6,6,1), (6,7,1), (5,6,1), (5,7,1)) in the eighth resource element group, 16 resource elements in total.

For another example, assuming that 32 antenna ports are configured in the reference signal port configuration, 32 resource elements in each physical resource block pair that are configured in the reference signal configuration and carry a reference signal include, for example, the eight resource elements in the first resource element group, the eight resource elements in the second resource element group, the eight resource elements in the fifth resource element group, and the eight resource elements in the seventh resource element group, 32 resource elements in total. The rest may be deduced by analogy.

For example, assuming that 16 antenna ports are configured in the reference signal port configuration, 16 resource elements in each physical resource block pair that are configured in the reference signal configuration and carry a reference signal include, for example, the eight resource elements in the thirteenth resource element group and the eight resource elements in the ninth resource element group, 16 resource elements in total; or may include: the eight resource elements in the ninth resource element group, four resource elements (for example, (11,1,0), (11,2,0), (8,1,0), (8,2,0)) in the thirteenth resource element group, and four resource elements (for example, (3,1,0), (3,2,0), (0,1,0), (0,2,0)) in the fourteenth resource element group, 16 resource elements in total.

For another example, assuming that 32 antenna ports are configured in the reference signal port configuration, 32 resource elements in each physical resource block pair that are configured in the reference signal configuration and carry a reference signal include, for example, the eight resource elements in the thirteenth resource element group, the eight resource elements in the ninth resource element group, the eight resource elements in the tenth resource element group, and the eight resource elements in the fourteenth resource element group, 32 resource elements in total. The rest may be deduced by analogy.

Referring to FIG. 4-*b* to FIG. 4-*j*, FIG. 4-*b* to FIG. 4-*j* are schematic diagrams exemplarily and separately showing positions of resource elements configured for 32 antenna ports, 16 antenna ports, and 8 antenna ports.

FIG. 4-*b* to FIG. 4-*f* exemplarily show possible positions of eight resource elements that are in a PRB pair and used to transmit a reference signal. FIG. 4-*g* to FIG. 4-*h* exemplarily show possible positions of 16 resource elements that are in a PRB pair and used to transmit a reference signal. FIG. 4-*i* to FIG. 4-*j* exemplarily show possible positions of 32 resource elements that are in a PRB pair and used to transmit a reference signal.

The foregoing are examples of positions of resource elements, and an actual application is not limited to the foregoing examples.

402. The base station sends a reference signal to the user equipment according to the notified reference signal resource configuration.

403. The user equipment receives the reference signal based on the reference signal resource configuration, and performs measurement based on the foregoing received reference signal, so as to obtain channel state information and/or signal quality information.

404. The user equipment reports the obtained channel state information and/or signal quality information to the base station.

In some embodiments of the present application, the channel state information includes an RI, or a PMI, or a CQI.

In some embodiments of the present application, the foregoing signal quality information includes RSRP, or RSR, or an RSSI, or the like.

As seen from above, in the embodiment of the present application, a base station notifies a user equipment of reference signal resource configuration, where the foregoing reference signal resource configuration includes reference signal port configuration, reference signal subframe configuration, and reference signal configuration, and a quantity of ports configured in the foregoing reference signal port configuration is N; and sends a reference signal to the foregoing user equipment according to the foregoing notified reference signal resource configuration. In the embodiment of the present application, the reference signal resource configuration of the base station includes reference signal port configuration, where a quantity of ports configured in the reference signal port configuration is N; and a quantity of supported ports may vary with different values of N (for example, if N is greater than 8, it indicates that the quantity of supported ports is greater than 8). This can improve flexibility of reference signal port configuration and help to support more antenna ports.

Further, multiple selectable resource elements in new positions are used to send reference signals, which helps to obtain higher gain and reduce interference.

For a better understanding and implementation of the foregoing solutions in the embodiments of the present application, the following further provides related apparatuses that are used to implement the foregoing solutions.

Figure 5:
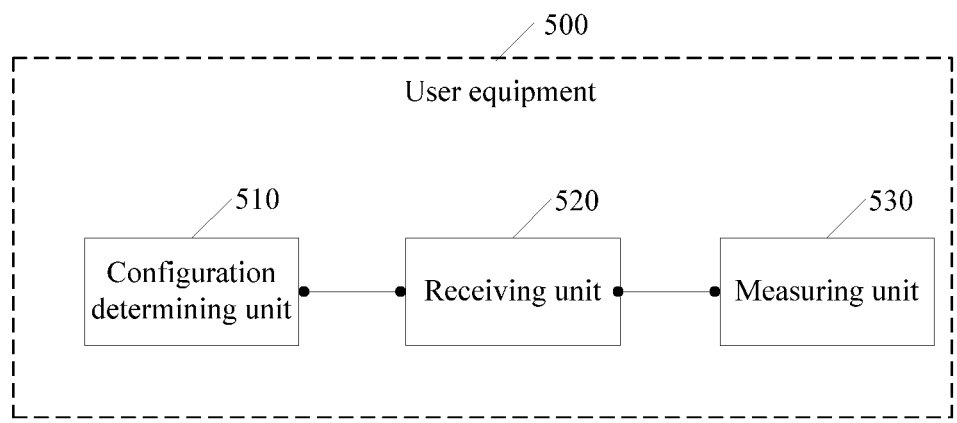
FIG. 5 is a schematic diagram of a user equipment according to an embodiment of the present application.

Referring to FIG. 5, an embodiment of the present application provides a user equipment 500. The user equipment 500 may include a configuration determining unit 510, a receiving unit 520, and a measuring unit 530.

The configuration determining unit 510 is configured to determine reference signal resource configuration, where the foregoing reference signal resource configuration includes reference signal port configuration, reference signal subframe configuration, and reference signal configuration; and a quantity of ports configured in the foregoing reference signal port configuration is N.

The receiving unit 520 is configured to receive a reference signal based on the reference signal resource configuration.

The measuring unit 530 performs measurement based on the foregoing received reference signal, so as to obtain channel state information and/or signal quality information.

In some embodiments of the present application, the subframe configured in the foregoing reference signal subframe configuration determined by the configuration determining unit 510 is an MBSFN subframe. Certainly, the subframe configured in the foregoing reference signal subframe configuration may be a non-MBSFN subframe, or may include a non-MBSFN subframe and an MBSFN subframe.

In some embodiments of the present application, a subframe configured in the reference signal subframe configuration does not include: transmission over a PDCCH that carries downlink control information used for scheduling a PDSCH; and/or, the subframe configured in the reference signal subframe configuration does not include: transmission over a physical downlink shared channel; and/or, the subframe configured in the reference signal subframe configuration does not include: a demodulation reference signal (DMRS); and/or, the subframe configured in the reference signal subframe configuration does not include: a part or entirety of cell-specific reference signals (CRS).

It should be noted that, that a subframe configured in the reference signal subframe configuration does not include transmission over a PDCCH that carries downlink control information used for scheduling a PDSCH means that the subframe configured in the reference signal subframe configuration may include or may not include transmission over a PDCCH that carries downlink control information used for scheduling a PUSCH.

In some embodiments of the present application, the subframe configured in the foregoing reference signal subframe configuration may not include transmission over a PDCCH that carries downlink control information used for scheduling a PDSCH and transmission over a PDCCH that carries downlink control information used for scheduling an uplink PUSCH.

In some embodiments of the present application, the user equipment may obtain the reference signal subframe configuration by receiving a system message sent by a base station. For example, the user equipment may obtain the reference signal subframe configuration according to a system information block (SIB) in a received system message that is sent by the base station, where the foregoing system message sent by the base station may be area-specific, cell-specific, or user-group-specific. Alternatively, the user equipment may obtain the reference signal subframe configuration by receiving higher layer signaling sent by the base station, where the higher layer signaling may be radio resource control (RRC) signaling or other higher layer signaling.

In some embodiments of the present application, the user equipment may determine the reference signal subframe configuration by using a predefined formula. For example, the reference signal subframe configuration includes a subframe that satisfies the following relationship:

$$[(10 \cdot n_f + \lfloor n_s/2 \rfloor) \bmod T] = \Delta \quad \text{(formula 1)},$$

where $n_f$ indicates a radio frame number or a system frame number; $n_s$ indicates a timeslot (slot) number in a radio frame; T indicates a subframe period; and $\Delta$ indicates an offset. T and $\Delta$ may be predefined, for example, may be determined based on a cell identifier. In addition, the base station may also notify the UE by using higher layer signaling (for example, RRC signaling) or downlink control information. In addition, the reference signal subframe configured in the reference signal subframe configuration may include multiple subframes that satisfy formula 1. In some embodiments of the present application, the reference signal subframe configured in the foregoing reference signal subframe configuration may also be an MBSFN subframe that satisfies formula 1.

In some embodiments of the present application, N resource elements in each physical resource block pair (PRB Pair) that are configured in the foregoing reference signal configuration and carry a reference signal may be: N resource elements in M resource element groups, where each resource element group in the foregoing M resource element groups may include eight resource elements, and M is an integer greater than or equal to 2.

In some embodiments of the present application, the N resource elements in each physical resource block pair (PRB Pair) that are configured in the foregoing reference signal configuration and carry a reference signal are N resource elements in X resource element groups in the foregoing M resource element groups, where X equals an integer that is obtained by rounding up N/8, and X is a positive integer less than or equal to M.

In some embodiments of the present application, the foregoing reference signal configuration may be used to indicate a resource element and a corresponding timeslot that are occupied by a reference signal, where the resource element or timeslot occupied by the reference signal may be, for example, a resource element and a timeslot that are occupied by a CSI RS and defined in LTE R10, a combination with any other resource element and timeslot except a resource element and a timeslot that are occupied by a CSI RS and defined in LTE R10, or a combination with any other resource element and timeslot except a resource element and a timeslot that are occupied by a CSI RS and defined in LTE R10.

A position of a resource element is denoted by a triplet (k',l',$n_s$ mod 2), where in the triplet (k',l',$n_s$ mod 2), k' indicates an index of a subcarrier corresponding to the resource element in a physical resource block pair in which the resource element is located; l' indicates an index of an orthogonal frequency division multiplexing OFDM symbol corresponding to the resource element in the physical resource block pair in which the resource element is located; $n_s$ indicates an index of a timeslot in which the resource element is located; and $n_s$ mod 2 indicates a value obtained by performing a modulo-2 operation on $n_s$.

In some embodiments of the present application, the foregoing M resource element groups may include, for example, at least one of the following eight resource element groups: a first resource element group, a second resource element group, a third resource element group, a fourth resource element group, a fifth resource element group, a sixth resource element group, a seventh resource element group, and an eighth resource element group.

Positions of the eight resource elements in the first resource element group may be respectively denoted by the triplet (k',l',$n_s$ mod 2) as follows:
{(9,5,0), (9,6,0), (3,5,0), (3,6,0), (8,5,0), (8,6,0), (2,5,0), (2,6,0)}; or
{(11,2,1), (11,3,1), (5,2,1), (5,3,1), (10,2,1), (10,3,1), (4,2,1), (4,3,1)}; or
{(9,2,1), (9,3,1), (3,2,1), (3,3,1), (8,2,1), (8,3,1), (2,2,1), (2,3,1)}; or
{(7,2,1), (7,3,1), (1,2,1), (1,3,1), (6,2,1), (6,3,1), (0,2,1), (0,3,1)}; or
{(9,5,1), (9,6,1), (3,5,1), (3,6,1), (8,5,1), (8,6,1), (2,5,1), (2,6,1)}.

For example, the resource element (9,5,0) indicates that a subcarrier corresponding to the resource element is subcarrier 9, an OFDM symbol corresponding to the resource element is OFDM symbol 5, and a timeslot corresponding to a PRB to which the resource element belongs is timeslot 0 in a corresponding subframe. The rest may be deduced by analogy.

Positions of the eight resource elements in the second resource element group may be respectively denoted by the triplet (k',l',$n_s$ mod 2) as follows:
{(11,5,0), (11,6,0), (5,5,0), (5,6,0), (10,5,0), (10,6,0), (4,5,0), (4,6,0)}; or
{(7,5,0), (7,6,0), (1,5,0), (1,6,0), (6,5,0), (6,6,0), (0,5,0), (0,6,0)}; or
{(11,6,1), (11,7,1), (5,6,1), (5,7,1), (10,6,1), (10,7,1), (4,6,1), (4,7,1)}; or
{(7,6,1), (7,7,1), (1,6,1), (1,7,1), (6,6,1), (6,7,1), (0,6,1), (0,7,1)}.

Positions of the eight resource elements in the third resource element group may be respectively denoted by the triplet (k',l',$n_s$ mod 2) as follows:
{(11,0,1), (11,1,1), (5,0,1), (5,1,1), (10,0,1), (10,1,1), (4,0,1), (4,1,1)}; or
{(9,0,1), (9,1,1), (3,0,1), (3,1,1), (8,0,1), (8,1,1), (2,0,1), (2,1,1)}; or
{(7,0,1), (7,1,1), (1,0,1), (1,1,1), (6,0,1), (6,1,1), (0,0,1), (0,1,1)}; or
{(11,3,0), (11,4,0), (5,3,0), (5,4,0), (10,3,0), (10,4,0), (4,3,0), (4,4,0)}; or
{(9,3,0), (9,4,0), (3,3,0), (3,4,0), (8,3,0), (8,4,0), (2,3,0), (2,4,0)}; or
{(7,3,0), (7,4,0), (1,3,0), (1,4,0), (6,3,0), (6,4,0), (0,3,0), (0,4,0)}.

Positions of the eight resource elements in the fourth resource element group may be respectively denoted by the triplet (k',l',$n_s$ mod 2) as follows:
{(11,1,0), (11,2,0), (5,1,0), (5,2,0), (10,1,0), (10,2,0), (4,1,0), (4,2,0)}; or
{(9,1,0), (9,2,0), (3,1,0), (3,2,0), (8,1,0), (8,2,0), (2,1,0), (2,2,0)}; or
{(7,1,0), (7,2,0), (1,1,0), (1,2,0), (6,1,0), (6,2,0), (0,1,0), (0,2,0)}.

Positions of the eight resource elements in the fifth resource element group may be respectively denoted by the triplet (k',l',$n_s$ mod 2) as follows:
{(11,0,1), (11,1,1), (5,0,1), (5,1,1), (10,0,1), (10,1,1), (4,0,1), (4,1,1)}; or
{(8,0,1), (8,1,1), (2,0,1), (2,1,1), (7,0,1), (7,1,1), (1,0,1), (1,1,1)}; or
{(11,3,0), (11,4,0), (5,3,0), (5,4,0), (10,3,0), (10,4,0), (4,3,0), (4,4,0)}; or
{(8,3,0), (8,4,0), (2,3,0), (2,4,0), (7,3,0), (7,4,0), (1,3,0), (1,4,0)}.

Positions of the eight resource elements in the sixth resource element group may be respectively denoted by the triplet (k',l',$n_s$ mod 2) as follows:
{(11,5,0), (11,6,0), (10,5,0), (10,6,0), (11,6,1), (11,7,1), (10,6,1), (10,7,1)}; or
{(6,5,0), (6,6,0), (5,5,0), (5,6,0), (6,6,1), (6,7,1), (5,6,1), (5,7,1)}; or
{(1,5,0), (1,6,0), (0,5,0), (0,6,0), (1,2,0), (1,3,0), (0,2,0), (0,3,0)}.

Positions of the eight resource elements in the seventh resource element group may be respectively denoted by the triplet (k',l',$n_s$ mod 2) as follows:
{(11,2,0), (11,3,0), (5,2,0), (5,3,0), (10,2,0), (10,3,0), (4,2,0), (4,3,0)}; or
{(9,2,0), (9,3,0), (3,2,0), (3,3,0), (8,2,0), (8,3,0), (2,2,0), (2,3,0)}; or
{(7,2,0), (7,3,0), (1,2,0), (1,3,0), (6,2,0), (6,3,0), (0,2,0), (0,3,0)}.

Positions of the eight resource elements in the eighth resource element group may be respectively denoted by the triplet (k',l',$n_s$ mod 2) as follows:
{(11,5,0), (11,6,0), (10,5,0), (10,6,0), (11,6,1), (11,7,1), (10,6,1), (10,7,1)}; or
{(6,5,0), (6,6,0), (5,5,0), (5,6,0), (6,6,1), (6,7,1), (5,6,1), (5,7,1)}; or
{(1,5,0), (1,6,0), (0,5,0), (0,6,0), (1,2,0), (1,3,0), (0,2,0), (0,3,0)}.

In some embodiments of the present application, the foregoing M resource element groups may include, for example, at least one of the following six resource element groups: a ninth resource element group, a tenth resource element group, an eleventh resource element group, a twelfth resource element group, a thirteenth resource element group, and a fourteenth resource element group.

Positions of the eight resource elements in the ninth resource element group may be respectively denoted by the triplet (k',l',$n_s$ mod 2) as follows:
{(11,4,0), (11,5,0), (8,4,0), (8,5,0), (5,4,0), (5,5,0), (2,4,0), (2,5,0)}; or
{(9,4,0), (9,5,0), (6,4,0), (6,5,0), (3,4,0), (3,5,0), (0,4,0), (0,5,0)}; or {(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the tenth resource element group may be respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group may be respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group may be respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirteenth resource element group may be respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group may be respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

In some embodiments of the present application, the channel state information may further be obtained based on a zero-power reference signal in an interference measurement resource, where resource elements included in each physical resource block pair (PRB Pair) in the foregoing interference measurement resource include at least one of the following eight resource element groups: a twenty-first resource element group, a twenty-second resource element group, a twenty-third resource element group, a twenty-fourth resource element group, a twenty-fifth resource element group, a twenty-sixth resource element group, a twenty-seventh resource element group, and a twenty-eighth resource element group. Alternatively, resource elements included in each physical resource block pair (PRB Pair) in the interference measurement resource include at least one of the following six resource element groups: a twenty-ninth resource element group, a thirtieth resource element group, a thirty-first resource element group, a thirty-second resource element group, a thirty-third resource element group, and a thirty-fourth resource element group.

Positions of the eight resource elements in the twenty-first resource element group are respectively denoted by the triplet (k',l',$n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

Positions of the eight resource elements in the twenty-second resource element group are respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the twenty-third resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the twenty-fourth resource element group are respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the twenty-fifth resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the twenty-sixth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-seventh resource element group are respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the twenty-eighth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-ninth resource element group are respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the thirtieth resource element group are respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the thirty-first resource element group are respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the thirty-second resource element group are respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirty-third resource element group are respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}., or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the thirty-fourth resource element group are respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

A resource element occupied by a zero-power reference signal and a resource element occupied by a non-zero-power reference signal may overlap or may not overlap.

It should be understood that a function of each function module of the user equipment 500 in the embodiment may be specifically implemented according to the method in the foregoing method embodiment. For the specific implementation process, reference may be made to the descriptions related to the foregoing method embodiment, and details are not described herein again.

Figure 6:
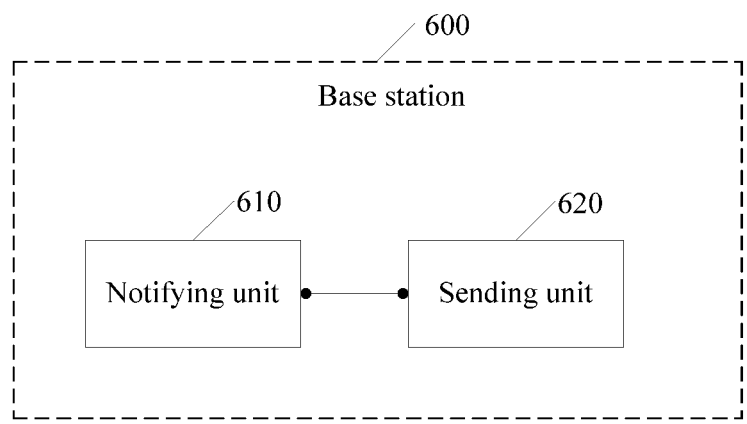
FIG. 6 is a schematic diagram of a base station according to an embodiment of the present application.

Referring to FIG. 6, an embodiment of the present application further provides a base station 600. The base station 600 may include a notifying unit 610 and a signal sending unit 620.

The notifying unit 610 is configured to notify a user equipment of reference signal resource configuration, where the foregoing reference signal resource configuration includes reference signal port configuration, reference signal subframe configuration, and reference signal configuration; and a quantity of ports configured in the foregoing reference signal port configuration is N.

The signal sending unit 620 is configured to send a reference signal to the foregoing user equipment according to the foregoing notified reference signal resource configuration.

In some embodiments of the present application, a subframe configured in the reference signal subframe configuration does not include: transmission over a physical downlink control channel (PDCCH) that carries downlink control information used for scheduling a physical downlink shared channel (PDSCH); and/or, the subframe configured in the reference signal subframe configuration does not include: transmission over a physical downlink shared channel; and/or, the subframe configured in the reference signal subframe configuration does not include: a demodulation reference signal (DMRS); and/or, the subframe configured in the reference signal subframe configuration does not include: a part or entirety of cell-specific reference signals (CRS).

It should be noted that, that a subframe configured in the reference signal subframe configuration does not include transmission over a physical downlink control channel (PDCCH) that carries downlink control information used for scheduling a physical downlink shared channel (PDSCH) means that the subframe configured in the reference signal subframe configuration may include or may not include transmission over a PDCCH that carries downlink control information used for scheduling a physical uplink shared channel (PUSCH).

In some embodiments of the present application, the subframe configured in the foregoing reference signal subframe configuration may not include transmission over a PDCCH that carries downlink control information used for scheduling a PDSCH and transmission over a PDCCH that carries downlink control information used for scheduling an uplink PUSCH.

In some embodiments of the present application, the subframe configured in the foregoing reference signal subframe configuration may be, for example, a multicast-broadcast single frequency network (MBSFN) subframe. Certainly, the subframe configured in the foregoing reference signal subframe configuration may be a non-MBSFN subframe, or may include a non-MBSFN subframe and an MBSFN subframe.

In some embodiments of the present application, the user equipment may obtain the reference signal subframe configuration by receiving a system message sent by the base station. For example, the user equipment may obtain the reference signal subframe configuration according to a system information block (SIB) in a received system message that is sent by the base station, where the foregoing system message sent by the base station may be area-specific, cell-specific, or user-group-specific. Alternatively, the user equipment may obtain the reference signal subframe configuration by receiving higher layer signaling sent by the base station, where the higher layer signaling may be radio resource control (RRC) signaling or other higher layer signaling.

In some embodiments of the present application, the user equipment may determine the reference signal subframe configuration by using a predefined formula. For example, the reference signal subframe configuration includes a subframe that satisfies the following relationship:

$$[(10 \cdot n_f + \lfloor n_s/2 \rfloor) \bmod T] = \Delta \quad \text{(formula 1)},$$

where $n_f$ indicates a radio frame number or a system frame number; $n_s$ indicates a timeslot (slot) number in a radio frame; T indicates a subframe period; and $\Delta$ indicates an offset. T and $\Delta$ may be predefined, for example, may be determined based on a cell identifier. In addition, the base station may also notify the UE by using higher layer signaling (for example, RRC signaling) or downlink control information. In addition, the reference signal subframe configured in the reference signal subframe configuration may include multiple subframes that satisfy formula 1. In some embodiments of the present application, the reference signal subframe configured in the foregoing reference signal subframe configuration may also be an MBSFN subframe that satisfies formula 1.

In some embodiments of the present application, N resource elements in each physical resource block pair (PRB Pair) that are configured in the foregoing reference signal configuration and carry a reference signal may be: N resource elements in M resource element groups, where each resource element group in the foregoing M resource element groups may include eight resource elements, and M is an integer greater than or equal to 2.

In some embodiments of the present application, the N resource elements in each physical resource block pair (PRB Pair) that are configured in the foregoing reference signal configuration and carry a reference signal are N resource elements in X resource element groups in the foregoing M resource element groups, where X equals an integer that is obtained by rounding up N/8, and X is a positive integer less than or equal to M.

In some embodiments of the present application, the foregoing reference signal configuration may be used to indicate a resource element and a corresponding timeslot that are occupied by a reference signal, where the resource element or timeslot occupied by the reference signal may be, for example, a resource element and a timeslot that are occupied by a CSI RS and defined in LTE R10, a combination with any other resource element and timeslot except a resource element and a timeslot that are occupied by a CSI RS and defined in LTE R10, or a combination with any other resource element and timeslot except a resource element and a timeslot that are occupied by a CSI RS and defined in LTE R10.

A position of a resource element is denoted by a triplet $(k',l',n_s \bmod 2)$, where in the triplet $(k',l',n_s \bmod 2)$, $k'$ indicates an index of a subcarrier corresponding to the resource element in a physical resource block pair in which the resource element is located; $l'$ indicates an index of an orthogonal frequency division multiplexing OFDM symbol corresponding to the resource element in the physical resource block pair in which the resource element is located; $n_s$ indicates an index of a timeslot in which the resource element is located; and $n_s \bmod 2$ indicates a value obtained by performing a modulo-2 operation on $n_s$.

In some embodiments of the present application, the foregoing M resource element groups may include, for example, at least one of the following eight resource element groups: a first resource element group, a second resource element group, a third resource element group, a fourth resource element group, a fifth resource element group, a sixth resource element group, a seventh resource element group, and an eighth resource element group.

Positions of the eight resource elements in the first resource element group may be respectively denoted by the triplet $(k',l',n_s \bmod 2)$ as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

For example, the resource element (9,5,0) indicates that a subcarrier corresponding to the resource element is subcarrier 9, an OFDM symbol corresponding to the resource element is OFDM symbol 5, and a timeslot corresponding to a PRB to which the resource element belongs is timeslot 0 in a corresponding subframe. The rest may be deduced by analogy.

Positions of the eight resource elements in the second resource element group may be respectively denoted by the triplet $(k',l',n_s \bmod 2)$ as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the third resource element group may be respectively denoted by the triplet $(k',l',n_s \bmod 2)$ as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the fourth resource element group may be respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the fifth resource element group may be respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the sixth resource element group may be respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the seventh resource element group may be respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the eighth resource element group may be respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

In some embodiments of the present application, the foregoing M resource element groups may include, for example, at least one of the following six resource element groups: a ninth resource element group, a tenth resource element group, an eleventh resource element group, a twelfth resource element group, a thirteenth resource element group, and a fourteenth resource element group.

Positions of the eight resource elements in the ninth resource element group may be respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the tenth resource element group may be respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group may be respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group may be respectively denoted by the triplet (k',l',$n_s$ mod 2) as follows:

{(9,1,1), (9,2,1), (6,1,1), (6,2,1), (3,1,1), (3,2,1), (0,1,1), (3,2,1)}.

Positions of the eight resource elements in the thirteenth resource element group may be respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group may be respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

In some embodiments of the present application, the channel state information may further be obtained based on a zero-power reference signal in an interference measurement resource, where resource elements included in each physical resource block pair (PRB Pair) in the foregoing interference measurement resource include at least one of the following eight resource element groups: a twenty-first resource element group, a twenty-second resource element group, a twenty-third resource element group, a twenty-fourth resource element group, a twenty-fifth resource element group, a twenty-sixth resource element group, a twenty-seventh resource element group, and a twenty-eighth resource element group. Alternatively, resource elements included in each physical resource block pair (PRB Pair) in the interference measurement resource include at least one of the following six resource element groups: a twenty-ninth resource element group, a thirtieth resource element group, a thirty-first resource element group, a thirty-second resource element group, a thirty-third resource element group, and a thirty-fourth resource element group.

Positions of the eight resource elements in the twenty-first resource element group are respectively denoted by the triplet ($k',l',n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

Positions of the eight resource elements in the twenty-second resource element group are respectively denoted by the triplet ($k',l',n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the twenty-third resource element group are respectively denoted by the triplet ($k',l',n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the twenty-fourth resource element group are respectively denoted by the triplet ($k',l',n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the twenty-fifth resource element group are respectively denoted by the triplet ($k',l',n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the twenty-sixth resource element group are respectively denoted by the triplet ($k',l',n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-seventh resource element group are respectively denoted by the triplet ($k',l',n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the twenty-eighth resource element group are respectively denoted by the triplet ($k',l',n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-ninth resource element group are respectively denoted by the triplet ($k',l',n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the thirtieth resource element group are respectively denoted by the triplet ($k',l',n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the thirty-first resource element group are respectively denoted by the triplet ($k',l',n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the thirty-second resource element group are respectively denoted by the triplet ($k',l',n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirty-third resource element group are respectively denoted by the triplet ($k',l',n_s$ mod 2) as follows:

{(11,1,0), (11,2,0), (8,1,0), (8,2,0), (54,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the thirty-fourth resource element group are respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

A resource element occupied by a zero-power reference signal and a resource element occupied by a non-zero-power reference signal may overlap or may not overlap.

It should be understood that a function of each function module of the base station 600 in the embodiment may be specifically implemented according to the method in the foregoing method embodiment. For the specific implementation process, reference may be made to the descriptions related to the foregoing method embodiment, and details are not described herein again.

Figure 7:
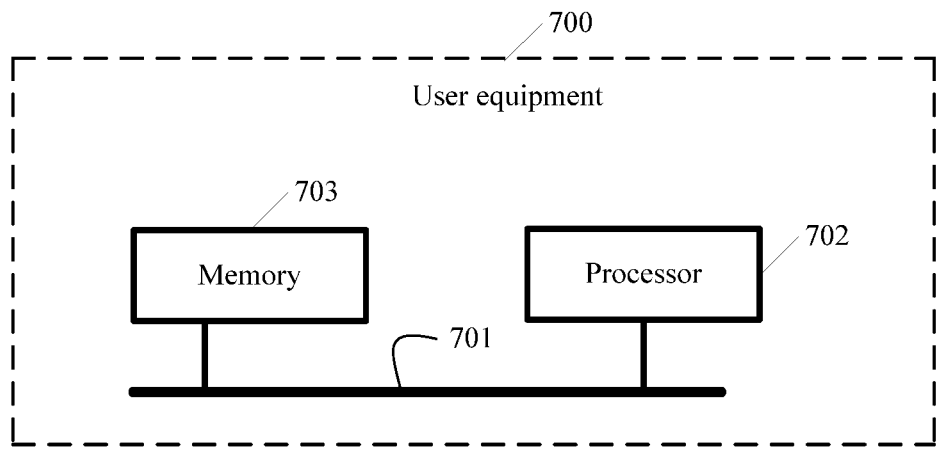
FIG. 7 is a schematic diagram of another user equipment according to an embodiment of the present application.

Referring to FIG. 7, an embodiment of the present application provides a user equipment 700.

As shown in FIG. 7, the user equipment 700 in the embodiment includes at least one bus 701, at least one processor 702 connected to the bus 701, and at least one memory 703 connected to the bus 701.

The processor 702 invokes, through the bus 701, code stored in the memory 703, so as to determine reference signal resource configuration, where the foregoing reference signal resource configuration includes reference signal port configuration, reference signal subframe configuration, and reference signal configuration, and a quantity of ports configured in the foregoing reference signal port configuration is N; receive a reference signal based on the foregoing reference signal resource configuration; and perform measurement based on the foregoing received reference signal, so as to obtain channel state information and/or signal quality information.

In some embodiments of the present application, a subframe configured in the reference signal subframe configuration does not include: transmission over a PDCCH that carries downlink control information used for scheduling a PDSCH; and/or, the subframe configured in the reference signal subframe configuration does not include: transmission over a physical downlink shared channel; and/or, the subframe configured in the reference signal subframe configuration does not include: a demodulation reference signal (DMRS); and/or, the subframe configured in the reference signal subframe configuration does not include: a part or entirety of cell-specific reference signals (CRS).

It should be noted that, that a subframe configured in the reference signal subframe configuration does not include transmission over a PDCCH that carries downlink control information used for scheduling a PDSCH means that the subframe configured in the reference signal subframe configuration may include or may not include transmission over a PDCCH that carries downlink control information used for scheduling a PUSCH.

In some embodiments of the present application, the subframe configured in the foregoing reference signal subframe configuration may not include transmission over a PDCCH that carries downlink control information used for scheduling a PDSCH and transmission over a PDCCH that carries downlink control information used for scheduling an uplink PUSCH.

In some embodiments of the present application, the user equipment may obtain the reference signal subframe configuration by receiving a system message sent by a base station. For example, the user equipment may obtain the reference signal subframe configuration according to a system information block (SIB) in a received system message that is sent by the base station, where the foregoing system message sent by the base station may be area-specific, cell-specific, or user-group-specific. Alternatively, the user equipment may obtain the reference signal subframe configuration by receiving higher layer signaling sent by the base station, where the higher layer signaling may be radio resource control (RRC) signaling or other higher layer signaling.

In some embodiments of the present application, the subframe configured in the foregoing reference signal subframe configuration may be, for example, a multicast-broadcast single frequency network (MBSFN) subframe. Certainly, the subframe configured in the foregoing reference signal subframe configuration may be a non-MBSFN subframe, or may include a non-MBSFN subframe and an MBSFN subframe.

In some embodiments of the present application, the user equipment may determine the reference signal subframe configuration by using a predefined formula. For example, the reference signal subframe configuration includes a subframe that satisfies the following relationship:

$$[(10 \cdot n_f + \lfloor n_s/2 \rfloor) \bmod T] = \Delta \qquad \text{(formula 1)},$$

where $n_f$ indicates a radio frame number or a system frame number; $n_s$ indicates a timeslot (slot) number in a radio frame; T indicates a subframe period; and Δ indicates an offset. T and Δ may be predefined, for example, may be determined based on a cell identifier. In addition, the base station may also notify the UE by using higher layer signaling (for example, RRC signaling) or downlink control information. In addition, the reference signal subframe configured in the reference signal subframe configuration may include multiple subframes that satisfy formula 1. In some embodiments of the present application, the reference signal subframe configured in the foregoing reference signal subframe configuration may also be an MBSFN subframe that satisfies formula 1.

In some embodiments of the present application, N resource elements in each physical resource block pair (PRB Pair) that are configured in the foregoing reference signal configuration and carry a reference signal may be: N resource elements in M resource element groups, where each resource element group in the foregoing M resource element groups may include eight resource elements, and M is an integer greater than or equal to 2.

In some embodiments of the present application, the N resource elements in each physical resource block pair (PRB Pair) that are configured in the foregoing reference signal configuration and carry a reference signal are N resource elements in X resource element groups in the foregoing M resource element groups, where X equals an integer that is obtained by rounding up N/8, and X is a positive integer less than or equal to M.

In some embodiments of the present application, the foregoing reference signal configuration may be used to indicate a resource element and a corresponding timeslot that are occupied by a reference signal, where the resource element or timeslot occupied by the reference signal may be, for example, a resource element and a timeslot that are occupied by a CSI RS and defined in LTE R10, a combination with any other resource element and timeslot except a resource element and a timeslot that are occupied by a CSI RS and defined in LTE R10, or a combination with any other resource element and timeslot except a resource element and a timeslot that are occupied by a CSI RS and defined in LTE R10.

A position of a resource element is denoted by a triplet (k',l',$n_s$ mod 2), where in the triplet (k',l',$n_s$ mod 2), k' indicates an index of a subcarrier corresponding to the resource element in a physical resource block pair in which the resource element is located; l' indicates an index of an orthogonal frequency division multiplexing OFDM symbol corresponding to the resource element in the physical resource block pair in which the resource element is located; $n_s$ indicates an index of a timeslot in which the resource element is located; and $n_s$ mod 2 indicates a value obtained by performing a modulo-2 operation on $n_s$.

In some embodiments of the present application, the foregoing M resource element groups may include, for example, at least one of the following eight resource element groups: a first resource element group, a second resource element group, a third resource element group, a fourth resource element group, a fifth resource element group, a sixth resource element group, a seventh resource element group, and an eighth resource element group.

Positions of the eight resource elements in the first resource element group may be respectively denoted by the triplet (k',l',$n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

For example, the resource element (9,5,0) indicates that a subcarrier corresponding to the resource element is subcarrier 9, an OFDM symbol corresponding to the resource element is OFDM symbol 5, and a timeslot corresponding to a PRB to which the resource element belongs is timeslot 0 in a corresponding subframe. The rest may be deduced by analogy.

Positions of the eight resource elements in the second resource element group may be respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the third resource element group may be respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the fourth resource element group may be respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the fifth resource element group may be respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the sixth resource element group may be respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the seventh resource element group may be respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the eighth resource element group may be respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

In some embodiments of the present application, the foregoing M resource element groups may include, for example, at least one of the following six resource element groups: a ninth resource element group, a tenth resource element group, an eleventh resource element group, a twelfth resource element group, a thirteenth resource element group, and a fourteenth resource element group.

Positions of the eight resource elements in the ninth resource element group may be respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the tenth resource element group may be respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group may be respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group may be respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirteenth resource element group may be respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group may be respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

In some embodiments of the present application, the channel state information may further be obtained based on a zero-power reference signal in an interference measurement resource, where resource elements included in each physical resource block pair (PRB Pair) in the foregoing interference measurement resource include at least one of the following eight resource element groups: a twenty-first resource element group, a twenty-second resource element group, a twenty-third resource element group, a twenty-fourth resource element group, a twenty-fifth resource element group, a twenty-sixth resource element group, a twenty-seventh resource element group, and a twenty-eighth resource element group. Alternatively, resource elements included in each physical resource block pair (PRB Pair) in the interference measurement resource include at least one of the following six resource element groups: a twenty-ninth resource element group, a thirtieth resource element group, a thirty-first resource element group, a thirty-second resource element group, a thirty-third resource element group, and a thirty-fourth resource element group.

Positions of the eight resource elements in the twenty-first resource element group are respectively denoted by the triplet (k',l',$n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

Positions of the eight resource elements in the twenty-second resource element group are respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the twenty-third resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the twenty-fourth resource element group are respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the twenty-fifth resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the twenty-sixth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-seventh resource element group are respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the twenty-eighth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-ninth resource element group are respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the thirtieth resource element group are respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the thirty-first resource element group are respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the thirty-second resource element group are respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirty-third resource element group are respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the thirty-fourth resource element group are respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

A resource element occupied by a zero-power reference signal and a resource element occupied by a non-zero-power reference signal may overlap or may not overlap.

The foregoing are examples of positions of resource elements, and an actual application is not limited to the foregoing examples.

In some embodiments of the present application, the user equipment may perform measurement based on the foregoing received reference signal, so as to obtain channel state information and/or reference signal transmit power. The user equipment may report the obtained channel state information and/or reference signal transmit power, or the like, to the base station.

In some embodiments of the present application, the channel state information includes an RI, or a PMI, or a CQI.

In some embodiments of the present application, the foregoing signal quality information includes RSRP, or RSR, or an RSSI, or the like.

It should be understood that a function of each function module of the user equipment 700 in the embodiment may be specifically implemented according to the method in the foregoing method embodiment. For the specific implementation process, reference may be made to the descriptions related to the foregoing method embodiment, and details are not described herein again.

Figure 8:
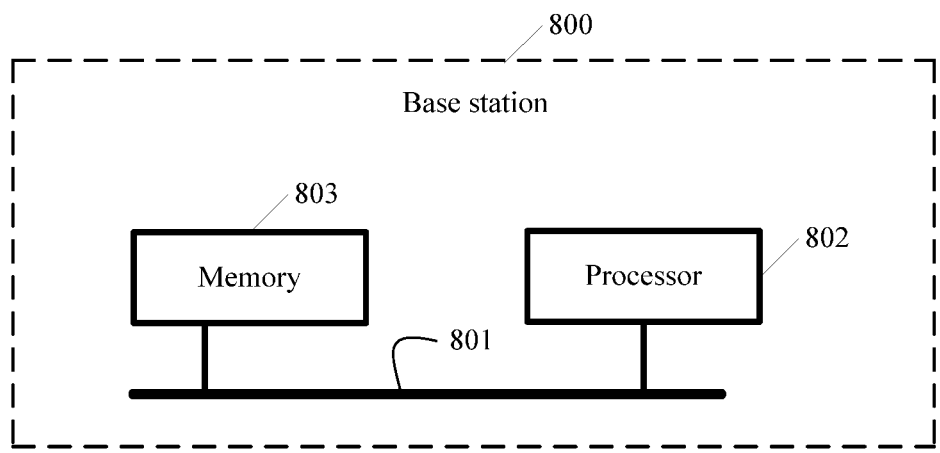
FIG. 8 is a schematic diagram of another base station according to an embodiment of the present application.

Referring to FIG. 8, an embodiment of the present application provides a base station 800.

As shown in FIG. 8, the base station 800 in the embodiment includes at least one bus 801, at least one processor 802 connected to the bus 801, and at least one memory 803 connected to the bus 801.

The processor 802 invokes, through the bus 801, code stored in the memory 803, so as to notify a user equipment of reference signal resource configuration, where the foregoing reference signal resource configuration includes reference signal port configuration, reference signal subframe configuration, and reference signal configuration, and a quantity of ports configured in the foregoing reference signal port configuration is N; and send a reference signal to the foregoing user equipment according to the foregoing notified reference signal resource configuration.

In some embodiments of the present application, a subframe configured in the reference signal subframe configuration does not include: transmission over a PDCCH that carries downlink control information used for scheduling a PDSCH; and/or, the subframe configured in the reference signal subframe configuration does not include: transmission over a physical downlink shared channel; and/or, the subframe configured in the reference signal subframe configuration does not include: a demodulation reference signal (DMRS); and/or, the subframe configured in the reference signal subframe configuration does not include: a part of entirety of cell-specific reference signals (CRS).

It should be noted that, that a subframe configured in the reference signal subframe configuration does not include transmission over a PDCCH that carries downlink control information used for scheduling a PDSCH means that the subframe configured in the reference signal subframe configuration may include or may not include transmission over a PDCCH that carries downlink control information used for scheduling a PUSCH.

In some embodiments of the present application, the subframe configured in the foregoing reference signal subframe configuration may not include transmission over a PDCCH that carries downlink control information used for scheduling a PDSCH and transmission over a PDCCH that carries downlink control information used for scheduling an uplink PUSCH.

In some embodiments of the present application, the user equipment may obtain the reference signal subframe configuration by receiving a system message sent by the base station. For example, the user equipment may obtain the reference signal subframe configuration according to a system information block (SIB) in a received system message that is sent by the base station, where the foregoing system message sent by the base station may be area-specific, cell-specific, or user-group-specific. Alternatively, the user equipment may obtain the reference signal subframe configuration by receiving higher layer signaling sent by the base station, where the higher layer signaling may be radio resource control (RRC) signaling or other higher layer signaling.

In some embodiments of the present application, the subframe configured in the foregoing reference signal subframe configuration may be, for example, a multicast-broadcast single frequency network (MBSFN) subframe. Certainly, the subframe configured in the foregoing reference signal subframe configuration may be a non-MBSFN subframe, or may include a non-MBSFN subframe and an MBSFN subframe.

In some embodiments of the present application, the user equipment may determine the reference signal subframe configuration by using a predefined formula. For example, the reference signal subframe configuration includes a subframe that satisfies the following relationship:

$$[(10 \cdot n_f + \lfloor n_s/2 \rfloor) \bmod T] = \Delta \quad \text{(formula 1)},$$

where $n_f$ indicates a radio frame number or a system frame number; $n_s$ indicates a timeslot (slot) number in a radio frame; T indicates a subframe period; and $\Delta$ indicates an offset. T and $\Delta$ may be predefined, for example, may be determined based on a cell identifier. In addition, the base station may also notify the UE by using higher layer signaling (for example, RRC signaling) or downlink control information. In addition, the reference signal subframe configured in the reference signal subframe configuration may include multiple subframes that satisfy formula 1. In some embodiments of the present application, the reference signal subframe configured in the foregoing reference signal subframe configuration may also be an MBSFN subframe that satisfies formula 1.

In some embodiments of the present application, N resource elements in each physical resource block pair (PRB Pair) that are configured in the foregoing reference signal configuration and carry a reference signal may be: N resource elements in M resource element groups, where each resource element group in the foregoing M resource element groups may include eight resource elements, and M is an integer greater than or equal to 2.

In some embodiments of the present application, the N resource elements in each physical resource block pair (PRB Pair) that are configured in the foregoing reference signal configuration and carry a reference signal are N resource elements in X resource element groups in the foregoing M resource element groups, where X equals an integer that is obtained by rounding up N/8, and X is a positive integer less than or equal to M.

In some embodiments of the present application, the foregoing reference signal configuration may be used to indicate a resource element and a corresponding timeslot that are occupied by a reference signal, where the resource element or timeslot occupied by the reference signal may be, for example, a resource element and a timeslot that are occupied by a CSI RS and defined in LTE R10, a combination with any other resource element and timeslot except a resource element and a timeslot that are occupied by a CSI RS and defined in LTE R10, or a combination with any other resource element and timeslot except a resource element and a timeslot that are occupied by a CSI RS and defined in LTE R10.

A position of a resource element is denoted by a triplet $(k',l',n_s \bmod 2)$, where in the triplet $(k',l',n_s \bmod 2)$, $k'$ indicates an index of a subcarrier corresponding to the resource element in a physical resource block pair in which the resource element is located; $l'$ indicates an index of an orthogonal frequency division multiplexing OFDM symbol corresponding to the resource element in the physical resource block pair in which the resource element is located; $n_s$ indicates an index of a timeslot in which the resource element is located; and $n_s \bmod 2$ indicates a value obtained by performing a modulo-2 operation on $n_s$.

In some embodiments of the present application, the foregoing M resource element groups may include, for example, at least one of the following eight resource element groups: a first resource element group, a second resource element group, a third resource element group, a fourth resource element group, a fifth resource element group, a sixth resource element group, a seventh resource element group, and an eighth resource element group.

Positions of the eight resource elements in the first resource element group may be respectively denoted by the triplet $(k',l',n_s \bmod 2)$ as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

For example, the resource element (9,5,0) indicates that a subcarrier corresponding to the resource element is subcarrier 9, an OFDM symbol corresponding to the resource element is OFDM symbol 5, and a timeslot corresponding to a PRB to which the resource element belongs is timeslot 0 in a corresponding subframe. The rest may be deduced by analogy.

Positions of the eight resource elements in the second resource element group may be respectively denoted by the triplet $(k',l',n_s \bmod 2)$ as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the third resource element group may be respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the fourth resource element group may be respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the fifth resource element group may be respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the sixth resource element group may be respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the seventh resource element group may be respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the eighth resource element group may be respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

In some embodiments of the present application, the foregoing M resource element groups may include, for example, at least one of the following six resource element groups: a ninth resource element group, a tenth resource element group, an eleventh resource element group, a twelfth resource element group, a thirteenth resource element group, and a fourteenth resource element group.

Positions of the eight resource elements in the ninth resource element group may be respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the tenth resource element group may be respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the eleventh resource element group may be respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the twelfth resource element group may be respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirteenth resource element group may be respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the fourteenth resource element group may be respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

In some embodiments of the present application, the channel state information may further be obtained based on a zero-power reference signal in an interference measurement resource, where resource elements included in each physical resource block pair (PRB Pair) in the foregoing interference measurement resource include at least one of the following eight resource element groups: a twenty-first resource element group, a twenty-second resource element group, a twenty-third resource element group, a twenty-fourth resource element group, a twenty-fifth resource element group, a twenty-sixth resource element group, a twenty-seventh resource element group, and a twenty-eighth resource element group. Alternatively, resource elements included in each physical resource block pair (PRB Pair) in the interference measurement resource include at least one of the following six resource element groups: a twenty-ninth resource element group, a thirtieth resource element group, a thirty-first resource element group, a thirty-second resource element group, a thirty-third resource element group, and a thirty-fourth resource element group.

Positions of the eight resource elements in the twenty-first resource element group are respectively denoted by the triplet (k',l',$n_s$ mod 2) as follows:

{(9,5,0), (9,6,0), (3,5,0), (3,6,0), (8,5,0), (8,6,0), (2,5,0), (2,6,0)}; or

{(11,2,1), (11,3,1), (5,2,1), (5,3,1), (10,2,1), (10,3,1), (4,2,1), (4,3,1)}; or

{(9,2,1), (9,3,1), (3,2,1), (3,3,1), (8,2,1), (8,3,1), (2,2,1), (2,3,1)}; or

{(7,2,1), (7,3,1), (1,2,1), (1,3,1), (6,2,1), (6,3,1), (0,2,1), (0,3,1)}; or

{(9,5,1), (9,6,1), (3,5,1), (3,6,1), (8,5,1), (8,6,1), (2,5,1), (2,6,1)}.

Positions of the eight resource elements in the twenty-second resource element group are respectively denoted by the triplet (k',l',$n_s$ mod 2) as follows:

{(11,5,0), (11,6,0), (5,5,0), (5,6,0), (10,5,0), (10,6,0), (4,5,0), (4,6,0)}; or

{(7,5,0), (7,6,0), (1,5,0), (1,6,0), (6,5,0), (6,6,0), (0,5,0), (0,6,0)}; or

{(11,6,1), (11,7,1), (5,6,1), (5,7,1), (10,6,1), (10,7,1), (4,6,1), (4,7,1)}; or

{(7,6,1), (7,7,1), (1,6,1), (1,7,1), (6,6,1), (6,7,1), (0,6,1), (0,7,1)}.

Positions of the eight resource elements in the twenty-third resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(9,0,1), (9,1,1), (3,0,1), (3,1,1), (8,0,1), (8,1,1), (2,0,1), (2,1,1)}; or

{(7,0,1), (7,1,1), (1,0,1), (1,1,1), (6,0,1), (6,1,1), (0,0,1), (0,1,1)}; or

{(11,3,0), (11,4,0), (5,3,0), (5,4,0), (10,3,0), (10,4,0), (4,3,0), (4,4,0)}; or

{(9,3,0), (9,4,0), (3,3,0), (3,4,0), (8,3,0), (8,4,0), (2,3,0), (2,4,0)}; or

{(7,3,0), (7,4,0), (1,3,0), (1,4,0), (6,3,0), (6,4,0), (0,3,0), (0,4,0)}.

Positions of the eight resource elements in the twenty-fourth resource element group are respectively denoted by the triplet (k',l',$n_s$ mod 2) as follows:

{(11,1,0), (11,2,0), (5,1,0), (5,2,0), (10,1,0), (10,2,0), (4,1,0), (4,2,0)}; or

{(9,1,0), (9,2,0), (3,1,0), (3,2,0), (8,1,0), (8,2,0), (2,1,0), (2,2,0)}; or

{(7,1,0), (7,2,0), (1,1,0), (1,2,0), (6,1,0), (6,2,0), (0,1,0), (0,2,0)}.

Positions of the eight resource elements in the twenty-fifth resource element group are respectively denoted by the triplet (k',l',$n_s$ mod 2) as follows:

{(11,0,1), (11,1,1), (5,0,1), (5,1,1), (10,0,1), (10,1,1), (4,0,1), (4,1,1)}; or

{(8,0,1), (8,1,1), (2,0,1), (2,1,1), (7,0,1), (7,1,1), (1,0,1), (1,1,1)}; or

{(11,3,0), (11,4,0), (5,3,0), (5,4,0), (10,3,0), (10,4,0), (4,3,0), (4,4,0)}; or

{(8,3,0), (8,4,0), (2,3,0), (2,4,0), (7,3,0), (7,4,0), (1,3,0), (1,4,0)}.

Positions of the eight resource elements in the twenty-sixth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-seventh resource element group are respectively denoted by the triplet (k',l',$n_s$ mod 2) as follows:

{(11,2,0), (11,3,0), (5,2,0), (5,3,0), (10,2,0), (10,3,0), (4,2,0), (4,3,0)}; or

{(9,2,0), (9,3,0), (3,2,0), (3,3,0), (8,2,0), (8,3,0), (2,2,0), (2,3,0)}; or

{(7,2,0), (7,3,0), (1,2,0), (1,3,0), (6,2,0), (6,3,0), (0,2,0), (0,3,0)}.

Positions of the eight resource elements in the twenty-eighth resource element group are respectively denoted by the triplet (k',l',$n_s$ mod 2) as follows:

{(11,5,0), (11,6,0), (10,5,0), (10,6,0), (11,6,1), (11,7,1), (10,6,1), (10,7,1)}; or

{(6,5,0), (6,6,0), (5,5,0), (5,6,0), (6,6,1), (6,7,1), (5,6,1), (5,7,1)}; or

{(1,5,0), (1,6,0), (0,5,0), (0,6,0), (1,2,0), (1,3,0), (0,2,0), (0,3,0)}.

Positions of the eight resource elements in the twenty-ninth resource element group are respectively denoted by the triplet (k',l',$n_s$ mod 2) as follows:

{(11,4,0), (11,5,0), (8,4,0), (8,5,0), (5,4,0), (5,5,0), (2,4,0), (2,5,0)}; or

{(9,4,0), (9,5,0), (6,4,0), (6,5,0), (3,4,0), (3,5,0), (0,4,0), (0,5,0)}; or

{(10,4,1), (10,5,1), (7,4,1), (7,5,1), (4,4,1), (4,5,1), (1,4,1), (1,5,1)}; or

{(9,4,1), (9,5,1), (6,4,1), (6,5,1), (3,4,1), (3,5,1), (0,4,1), (0,5,1)}.

Positions of the eight resource elements in the thirtieth resource element group are respectively denoted by the triplet (k',l',$n_s$ mod 2) as follows:

{(11,5,1), (11,6,1), (8,5,1), (8,6,1), (5,5,1), (5,6,1), (2,5,1), (2,6,1)}; or

{(10,4,0), (10,5,0), (7,4,0), (7,5,0), (4,4,0), (4,5,0), (1,4,0), (1,5,0)}.

Positions of the eight resource elements in the thirty-first resource element group are respectively denoted by the triplet (k',l',$n_s$ mod 2) as follows:

{(11,0,1), (11,1,1), (8,0,1), (8,1,1), (5,0,1), (5,1,1), (2,0,1), (2,1,1)}; or

{(11,2,1), (11,3,1), (8,2,1), (8,3,1), (5,2,1), (5,3,1), (2,2,1), (2,3,1)}; or

{(10,0,1), (10,1,1), (7,0,1), (7,1,1), (4,0,1), (4,1,1), (1,0,1), (1,1,1)}; or

{(10,2,1), (10,3,1), (7,2,1), (7,3,1), (4,2,1), (4,3,1), (1,2,1), (1,3,1)}; or

{(11,1,1), (11,2,1), (8,1,1), (8,2,1), (5,1,1), (5,2,1), (2,1,1), (2,2,1)}; or

{(10,1,1), (10,2,1), (7,1,1), (7,2,1), (4,1,1), (4,2,1), (1,1,1), (1,2,1)}.

Positions of the eight resource elements in the thirty-second resource element group are respectively denoted by the triplet (k',l',$n_s$ mod 2) as follows:

{(9,1,1), (9,2,1), (6,1,1), (6,2,1), (3,1,1), (3,2,1), (0,1,1), (0,2,1)}.

Positions of the eight resource elements in the thirty-third resource element group are respectively denoted by the triplet (k',l',$n_s$ mod 2) as follows:

{(11,1,0), (11,2,0), (8,1,0), (8,2,0), (5,1,0), (5,2,0), (2,1,0), (2,2,0)}; or

{(10,1,0), (10,2,0), (7,1,0), (7,2,0), (4,1,0), (4,2,0), (1,1,0), (1,2,0)}; or

{(9,1,0), (9,2,0), (6,1,0), (6,2,0), (3,1,0), (3,2,0), (0,1,0), (0,2,0)}.

Positions of the eight resource elements in the thirty-fourth resource element group are respectively denoted by the triplet (k',l',$n_s$ mod 2) as follows:

{(11,2,0), (11,3,0), (8,2,0), (8,3,0), (5,2,0), (5,3,0), (2,2,0), (2,3,0)}; or

{(10,2,0), (10,3,0), (7,2,0), (7,3,0), (4,2,0), (4,3,0), (1,2,0), (1,3,0)}; or

{(9,2,0), (9,3,0), (6,2,0), (6,3,0), (3,2,0), (3,3,0), (0,2,0), (0,3,0)}.

A resource element occupied by a zero-power reference signal and a resource element occupied by a non-zero-power reference signal may overlap or may not overlap.

The foregoing are examples of positions of resource elements, and an actual application is not limited to the foregoing examples.

In some embodiments of the present application, the user equipment may perform measurement based on the foregoing received reference signal, so as to obtain channel state information and/or reference signal transmit power. The user equipment may report the obtained channel state information and/or reference signal transmit power, or the like, to the base station.

In some embodiments of the present application, the channel state information includes an RI, or a PMI, or a CQI.

In some embodiments of the present application, the foregoing signal quality information includes RSRP, or RSR, or an RSSI, or the like.

It should be understood that a function of each function module of the base station 800 in the embodiment may be specifically implemented according to the method in the foregoing method embodiment. For the specific implementation process, reference may be made to the descriptions related to the foregoing method embodiment, and details are not described herein again.

Figure 9:
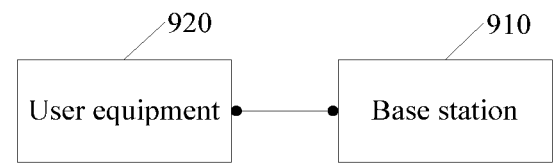
FIG. 9 is a schematic diagram of a communications system according to an embodiment of the present application.

Referring to FIG. 9, an embodiment of the present application further provides a communications system. The communications system may include a base station 910 and a user equipment 920.

The base station 910 is configured to notify the user equipment of reference signal resource configuration, where the foregoing reference signal resource configuration includes reference signal port configuration, reference signal subframe configuration, and reference signal configuration, and a quantity of ports configured in the foregoing reference signal port configuration is N; and send a reference signal to the foregoing user equipment according to the foregoing notified reference signal resource configuration.

The user equipment 920 is configured to determine reference signal resource configuration, where the foregoing reference signal resource configuration includes reference signal port configuration, reference signal subframe configuration, and reference signal configuration, and a quantity of ports configured in the foregoing reference signal port configuration is N; receive a reference signal based on the foregoing reference signal resource configuration; and perform measurement based on the foregoing received reference signal, so as to obtain channel state information and/or signal quality information.

An embodiment of the present application provides a CSI-RS configuration design solution for base station antenna configuration with more than eight antenna ports, and particularly for antenna configuration with 16, 32, or 64 antenna ports. The CSI-RS configuration can be used for channel state information measurement. The UE may measure a channel based on the reference signal and feedback channel state information; the base station can perform MCS selection and scheduling according to the channel state information, which can improve system throughput.

An embodiment of the present application further provides a computer storage medium, where the computer storage medium can store a program; and when the program runs, the program can execute a part or entirety of steps of the reference signal measurement method or reference signal sending method recorded in the foregoing method embodiments.

It should be noted that, for brief description, the foregoing method embodiments are represented as a series of actions. However, a person skilled in the art should appreciate that the present application is not limited to the described order of the actions, because according to the present application, some steps may be performed in other orders or simultaneously. In addition, a person skilled in the art should also understand that all the embodiments described in this specification belong to exemplary embodiments, and the involved actions and modules are not necessarily mandatory to the present application.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. A part or entirety of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present application. The foregoing storage medium includes any medium that can store program code, such as a USB flash drive, a read-only memory (ROM), a random access memory (RAM), a removable hard disk, a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method, comprising:
    sending, by a base station to a user equipment (UE), a reference signal configuration for a channel state information reference signal (CSI-RS), wherein the reference signal configuration indicates N resource elements in M resource element groups, wherein each resource element group of the M resource element groups comprises a respective four resource element pairs in which a first resource element pair of the respective resource element group is adjacent to a second resource element pair of the respective resource element group in time domain, a third resource element pair of the respective resource element group is adjacent to a fourth resource element pair of the respective resource element group in time domain, and each resource element pair in each resource element group of the M resource element groups comprises two respective resource elements that are adjacent in frequency domain, and wherein M is an integer greater than or equal to 2; and
    sending, by the base station to the UE, the CSI-RS according to the reference signal configuration.

2. The method according to claim 1, further comprising:
    sending, by the base station to the UE, a reference signal port configuration that defines a quantity of reference signal ports, wherein the quantity of reference signal ports is N, and N is greater than 8; and
    wherein sending the CSI-RS comprises:
    sending, by the base station to the UE, the CSI-RS to the UE according to the reference signal port configuration.

3. The method according to claim 1, wherein the reference signal configuration further indicates a corresponding slot occupied by the CSI-RS.

4. The method according to claim 1, wherein the N resource elements are:
    N resource elements in X resource element groups of the M resource element groups, wherein X is a smallest integer not less than N/8, and X is a positive integer less than or equal to M.

5. The method according to claim 1, further comprising:
    sending, by the base station to the UE, a reference signal subframe configuration.

6. The method according to claim 5, wherein a subframe configured by the reference signal subframe configuration does not comprise any of the following subframes:
    a subframe used for transmission over a physical downlink control channel, wherein the physical downlink control channel carries downlink control information used for scheduling a physical downlink shared channel;
    a subframe used for transmission over a physical downlink shared channel; a subframe used for transmitting a demodulation reference signal (DMRS); and
    a subframe used for transmitting a part or entirety of cell-specific reference signals (CRS).

7. The method according to claim 5, wherein a subframe configured by the reference signal subframe configuration is a multicast-broadcast single frequency network (MBSFN) subframe.

8. The method according to claim 1, further comprising:
    receiving, by the base station from the UE, channel state information or signal quality information obtained through measurement based on the CSI-RS.

9. An apparatus, comprising:
    a processor; and
    a computer-readable storage medium storing a program to be executed by the processor, the program including instructions for:
        sending, to a user equipment (UE), a reference signal configuration for a channel state information reference signal (CSI-RS), wherein the reference signal configuration indicates N resource elements in M resource element groups, wherein each resource element group of the M resource element groups comprises a respective four resource element pairs in which a first resource element pair of the respective resource element group is adjacent to a second resource element pair of the respective resource element group in time domain, a third resource element pair of the respective resource element group is adjacent to a fourth resource element pair of the respective resource element group in time domain, and each resource element pair in each resource element group of the M resource element groups comprises two respective resource elements that are adjacent in frequency domain, and wherein M is an integer greater than or equal to 2; and
        sending, to the UE, the CSI-RS according to the reference signal configuration.

10. The apparatus according to claim 9, wherein the program further includes instructions for:
    sending, to the UE, a reference signal port configuration that defines a quantity of reference signal ports, wherein the quantity of reference signal ports is N, and N is greater than 8, and the CSI-RS is sent to the UE according to the reference signal port configuration.

11. The apparatus according to claim 9, wherein the reference signal configuration further indicates a corresponding slot occupied by the CSI-RS.

12. The apparatus according to claim 9, wherein the N resource elements are:
    N resource elements in X resource element groups of the M resource element groups, wherein X is a smallest integer not less than N/8, and X is a positive integer less than or equal to M.

13. The apparatus according to claim 9, wherein the program further includes instructions for:
    sending, to the UE, a reference signal subframe configuration.

14. The apparatus according to claim 13, wherein a subframe configured by the reference signal subframe configuration does not comprise any of the following subframes:
- a subframe used for transmission over a physical downlink control channel, wherein the physical downlink control channel carries downlink control information used for scheduling a physical downlink shared channel;
- a subframe used for transmission over a physical downlink shared channel;
- a subframe used for transmitting a demodulation reference signal (DMRS); and
- a subframe used for transmitting a part or entirety of cell-specific reference signals (CRS).

15. The apparatus according to claim 13, wherein a subframe configured by the reference signal subframe configuration is a multicast-broadcast single frequency network (MBSFN) subframe.

16. A non-transitory computer-readable storage medium storing a program that is executable by a processor, the program including instructions for:
- sending, to a user equipment (UE), a reference signal configuration for a channel state information reference signal (CSI-RS), wherein reference signal configuration indicates N resource elements in M resource element groups, wherein each resource element group of the M resource element groups comprises a respective four resource element pairs in which a first resource element pair of the respective resource element group is adjacent to a second resource element pair of the respective resource element group in time domain, a third resource element pair of the respective resource element group is adjacent to a fourth resource element pair of the respective resource element group in time domain, and each resource element pair in each resource element group of the M resource element groups comprises two respective resource elements that are adjacent in frequency domain, and wherein M is an integer greater than or equal to 2; and
- sending, to the UE, the CSI-RS according to the reference signal configuration.

17. The non-transitory computer-readable storage medium according to claim 16, wherein the program further includes instructions for:
- sending, to the UE, a reference signal port configuration that defines a quantity of reference signal ports, wherein the quantity of reference signal ports is N, and N is greater than 8, and the CSI-RS is sent to the UE according to the reference signal port configuration.

18. The non-transitory computer-readable storage medium according to claim 16, wherein the reference signal configuration further indicates a corresponding slot occupied by the CSI-RS.

19. The non-transitory computer-readable storage medium according to claim 16, wherein the N resource elements are:
- N resource elements in X resource element groups of the M resource element groups, wherein X is a smallest integer not less than N/8, and X is a positive integer less than or equal to M.

20. The non-transitory computer-readable storage medium according to claim 16, wherein the program further includes instructions further for:
- sending, to the UE, a reference signal subframe configuration.

* * * * *